(12) United States Patent
Kurata

(10) Patent No.: US 7,010,670 B2
(45) Date of Patent: Mar. 7, 2006

(54) DATA PROCESSING DEVICE THAT CONTROLS AN OVERRIDING OF A SUBSEQUENT INSTRUCTION IN ACCORDANCE WITH A CONDITIONAL EXECUTION STATUS UPDATED BY A SEQUENCER

(75) Inventor: Kazushi Kurata, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 577 days.

(21) Appl. No.: 09/894,205

(22) Filed: Jun. 28, 2001

(65) Prior Publication Data

US 2002/0019929 A1   Feb. 14, 2002

(30) Foreign Application Priority Data

Jul. 4, 2000   (JP)   .............................. 2000-202674

(51) Int. Cl.
G06F 9/38   (2006.01)
(52) U.S. Cl. ........................................ 712/216; 712/234
(58) Field of Classification Search ................ 712/236, 712/234, 219, 216
See application file for complete search history.

(56) References Cited

U.S. PATENT DOCUMENTS

| | | | | |
|---|---|---|---|---|
| 3,577,189 A | * | 5/1971 | Cocke et al. ................ | 712/219 |
| 3,577,190 A | * | 5/1971 | Cocke et al. ................ | 712/226 |
| 4,539,635 A | * | 9/1985 | Boddie et al. ............... | 712/234 |
| 5,761,467 A | * | 6/1998 | Ando .......................... | 712/200 |
| 5,771,377 A | * | 6/1998 | Ando .......................... | 712/239 |
| 6,055,625 A | | 4/2000 | Nakada et al. | |
| 6,125,443 A | | 9/2000 | Takahashi | |

FOREIGN PATENT DOCUMENTS

| | | |
|---|---|---|
| JP | 62-262140 | 11/1987 |
| JP | 2-69826 | 3/1990 |
| JP | 3-269728 | 12/1991 |

OTHER PUBLICATIONS

Rosenberg, Dictionary of Computers, Information Processing & Telecommunications, 2$^{nd}$ edition, 1987, p. 491.*

* cited by examiner

Primary Examiner—William M. Treat
(74) Attorney, Agent, or Firm—Hamre, Schumann, Mueller & Larson, P.C.

(57) ABSTRACT

The invention provides a data processing device with which disadvantages due to instruction allocation and decreased memory when adding a condition specifying field for executing conditional instructions can be prevented, and in which pipeline hazards due to the non-fulfillment of conditions can be suppressed when instructions with contradicting conditions are performed successively. The data processing device reads in and executes instructions in a certain sequence, and includes a fetch portion for reading in a computational instruction, a decoding portion for decoding the computational instruction that has been read in, an execution portion for executing the decoded computational instruction, and an instruction overriding control circuit that overrides, of one or a plurality of subsequent instructions that follow the computational instruction in said sequence and are associated with the computational instruction, all but one of the subsequent instructions, in accordance with an execution result of the computational instruction.

18 Claims, 33 Drawing Sheets

| Exclusive condition \ Conditional execution status | x'00 | x'01 | x'10 | x'11 |
|---|---|---|---|---|
| 1 | Instruction overriding signal "0" | Instruction overriding signal "1" | Instruction overriding signal "0" | Instruction overriding signal "0" |
| 0 | Instruction overriding signal "0" | Instruction overriding signal "0" | Instruction overriding signal "1" | Instruction overriding signal "0" |

| | t1 | t2 | t3 | t4 | t5 | t6 |
|---|---|---|---|---|---|---|
| IF stage | Instruction 1 | Instruction 2 | Instruction 3 | Instruction 4 | Instruction 5 | Instruction 6 |
| DEC stage | | Instruction 1 | Instruction 2 | Instruction 3 | Instruction 4 | Instruction 5 |
| EX stage | | | Instruction 1 | Instruction 2 | ╳ | Instruction 4 |
| Conditional execution status | x'00 | x'00 | x'11 | x'10 | x'01 | x'00 |
| Exclusive condition | 0 | 0 | 0 | 1 | 1 | 1 |
| Instruction overriding signal | 0 | 0 | 0 | 0 | 1 | 0 |
| | [t11 t12] | [t21 t22] | [t31 t32] | [t41 t42] | [t51 t52] | [t61 t62] |

FIG. 4

| | |
|---|---|
| First line | SUBIFEZF R0,R1 |
| Second line | MOV R2,R4 |
| Third line | MOV R3,R4 |
| Fourth line | ADD R5,R6 |
| Fifth line | NOP |
| Sixth line | NOP |

FIG. 5

| | |
|---|---|
| First line | ADD R5,R1 |
| Second line | SUB R0,R1 |
| Third line | MOVIFZF R2,R4 |
| Fourth line | MOVIFNZF R3,R4 |
| Fifth line | ADD R4,R5 |
| Sixth line | MOV R5,R7 |
| Seventh line | MOVIFZF x'0001,R6 |
| Eighth line | MOV R6,R0 |

FIG. 7

| | |
|---|---|
| First line | ADD R5,R1 |
| Second line | SUBIFEZF R0,R1 |
| Third line | MOV R2,R4 |
| Fourth line | MOV R3,R4 |
| Fifth line | ADD R4,R5 |
| Sixth line | MOV R5,R7 |
| Seventh line | MOVIFZF x'0001,R6 |
| Eighth line | MOV R6,R0 |

FIG. 8

| Exclusive condition \ Conditional execution status | x'000 | x'010 or x'001 | x'100 or x'011 | x'101 |
|---|---|---|---|---|
| 1 | Instruction overriding signal "0" | Instruction overriding signal "1" | Instruction overriding signal "0" | Instruction overriding signal "0" |
| 0 | Instruction overriding signal "0" | Instruction overriding signal "0" | Instruction overriding signal "1" | Instruction overriding signal "0" |

| First line | SUBIFEXZF R0,R1 |
| Second line | MOV R2,R6 |
| Third line | MOV R3,R7 |
| Fourth line | MOV R4,R6 |
| Fifth line | MOV R5,R7 |
| Sixth line | MOV x'0001,R6 |
| Seventh line | ADD R0,R6 |
| Eighth line | NOP |

FIG. 12

| | t1 | t2 | t3 | t4 | t5 | t6 | t7 | t8 |
|---|---|---|---|---|---|---|---|---|
| IF stage | Instruction 1 | Instruction 2 | Instruction 3 | Instruction 4 | Instruction 5 | Instruction 6 | Instruction 7 | Instruction 8 |
| DEC stage | | Instruction 1 | Instruction 2 | Instruction 3 | Instruction 4 | Instruction 5 | Instruction 6 | Instruction 7 |
| EX stage | | | Instruction 1 | Instruction 2 | Instruction 3 | ✗ | ✗ | Instruction 6 |
| Conditional execution status | x'000 | x'000 | x'101 | x'100 | x'011 | x'010 | x'001 | x'000 |
| Exclusive condition | 0 | 0 | 0 | 1 | 1 | 1 | 1 | 1 |
| Instruction overriding signal | 0 | 0 | 0 | 0 | 0 | 1 | 1 | 0 |
| | [t11 t12] | [t21 t22] | [t31 t32] | [t41 t42] | [t51 t52] | [t61 t62] | [t71 t72] | [t81 t82] |

FIG. 13

| | |
|---|---|
| First line | SUB R0,R1 |
| Second line | MOVIFZF R2,R6 |
| Third line | MOVIFZF R3,R7 |
| Fourth line | MOVIFNZF R4,R6 |
| Fifth line | MOVIFNZF R5,R7 |
| Sixth line | MOV x'0001,R6 |
| Seventh line | ADD R0,R6 |
| Eighth line | NOP |

FIG. 14

| | |
|---|---|
| First line | SUB R0,R1 |
| Second line | MOVIFZF R2,R6 |
| Third line | MOVIFNZF R4,R6 |
| Fourth line | MOVIFNZF R5,R7 |
| Fifth line | MOVIFZF R3,R7 |
| Sixth line | MOV x'0001,R6 |
| Seventh line | ADD R0,R6 |
| Eighth line | NOP |

FIG. 15

| Exclusive condition \ Conditional execution status | x'00 | x'01 | x'10 |
|---|---|---|---|
| 1 | Instruction overriding signal "0" | Instruction overriding signal "1" | Instruction overriding signal "0" |
| 0 | Instruction overriding signal "0" | Instruction overriding signal "0" | Instruction overriding signal "0" |

| First line | SUBIFXZF R0,R1 |
| Second line | MOV R2,R3 |
| Third line | ADD R3,R6 |
| Fourth line | MOV R4,R7 |

FIG. 18

|  | t1 | t2 | t3 | t4 | t5 |
|---|---|---|---|---|---|
| IF stage | Instruction 1 | Instruction 2 | Instruction 3 | Instruction 4 | Instruction 5 |
| DEC stage |  | Instruction 1 | Instruction 2 | Instruction 3 | Instruction 4 |
| EX stage |  |  | Instruction 1 | ✗ | Instruction 3 |
| Conditional execution status | x'00 | x'00 | x'10 | x'01 | x'00 | x'00 |
| Exclusive condition | 0 | 0 | 0 | 1 | 1 | 1 |
| Instruction overriding signal | 0 | 0 | 0 | 1 | 0 | 0 |
|  | [t11 t12] | [t21 t22] | [t31 t32] | [t41 t42] | [t51 t52] |

FIG. 19

| | |
|---|---|
| First line | SUB R0,R1 |
| Second line | MOVIFNZF R2,R3 |
| Third line | ADD R3,R6 |
| Fourth line | MOV R4,R7 |

FIG. 21

| Exclusive condition \ Conditional execution status | x'00 | x'01 | x'10 | x'11 |
|---|---|---|---|---|
| 1 | Instruction overriding signal "0" | Instruction overriding signal "1" | Instruction overriding signal "1" | Instruction overriding signal "0" |
| 0 | Instruction overriding signal "0" | Instruction overriding signal "0" | Instruction overriding signal "0" | Instruction overriding signal "0" |

| First line | SUBIFNXZF R0,R1 |
| Second line | MOV R2,R3 |
| Third line | MOV R5,R4 |
| Fourth line | ADD R3,R6 |
| Fifth LINE | MOV R4,R7 |

FIG. 24

| | t1 | t2 | t3 | t4 | t5 | t6 |
|---|---|---|---|---|---|---|
| IF stage | Instruction 1 | Instruction 2 | Instruction 3 | Instruction 4 | Instruction 5 | Instruction 6 |
| DEC stage | | Instruction 1 | Instruction 2 | Instruction 3 | Instruction 4 | Instruction 5 |
| EX stage | | | Instruction 1 | ✗ | ✗ | Instruction 4 |
| Conditional execution status | x'00 | x'00 | x'11 | x'10 | x'01 | x'00 |
| Exclusive condition | 0 | 0 | 0 | 1 | 1 | 1 |
| Instruction overriding signal | 0 | 0 | 0 | 1 | 0 | 0 |
| | [t11 t12] | [t21 t22] | [t31 t32] | [t41 t42] | [t51 t52] | [t61 t62] |

FIG. 25

| | |
|---|---|
| First line | SUB R0,R1 |
| Second line | MOVIFNZF R2,R3 |
| Third line | MOVIFNZF R5,R4 |
| Fourth line | ADD R3,R6 |
| Fifth line | MOV R4,R7 |

FIG. 26

| Exclusive condition \ Conditional execution status | x'00 | x'01 | x'10 | x'11 |
|---|---|---|---|---|
| 1 | Instruction overriding signal "0" | × | Instruction overriding signal "0" | Instruction overriding signal "0" |
| 0 | Instruction overriding signal "0" | Instruction overriding signal "0" | Instruction overriding signal "1" | Instruction overriding signal "0" |

FIG. 30A

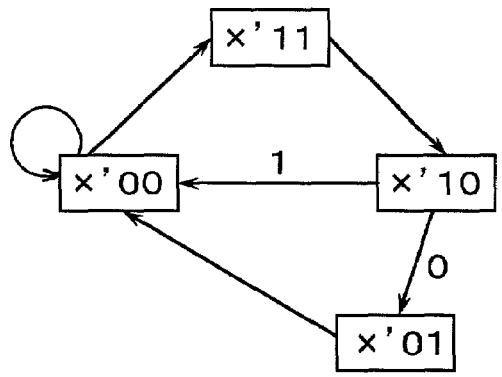

FIG. 30B

| Exclusive condition \ Conditional execution status | x'00 | x'01 | x'10 | x'11 |
|---|---|---|---|---|
| 1 | 0 | 0 | 1 | 0 |
| 0 | 0 | 0 | 0 | 0 |

FIG. 30C

| | t1 | t2 | t3 | t4 | t5 |
|---|---|---|---|---|---|
| Buffer 4 | Instruction 5 | Instruction 6 | Instruction 7 | — | — |
| Buffer 3 | Instruction 4 | Instruction 5 | Instruction 6 | Instruction 8 | Instruction 9 |
| Buffer 2 | Instruction 3 | Instruction 4 | Instruction 5 | Instruction 7 | Instruction 8 |
| Buffer 1 | Instruction 2 | Instruction 3 | Instruction 4 | Instruction 6 | Instruction 7 |
| Buffer 0 | Instruction 1 | Instruction 2 | Instruction 3 | Instruction 5 | Instruction 6 |
| IF stage | Instruction 1 | Instruction 2 | Instruction 3 | Instruction 5 | Instruction 6 |
| DEC stage | | Instruction 1 | Instruction 2 | Instruction 4 | Instruction 5 |
| EX stage | | | Instruction 1 | Instruction 2 | Instruction 4 |
| Conditional execution status | x'00 | x'00 | x'11 | x'10 | x'00 | x'00 |
| Instruction prefetch control signal | 0 | 0 | 0 | 1 | 0 |
| Exclusive condition | 0 | 0 | 0 | 1 | 1 |
| Instruction overriding signal | 0 | 0 | 0 | 0 | 0 |
| | [t11 t12] | [t21 t22] | [t31 t32] | [t41 t42] | [t51 t52] |

FIG. 31

| | |
|---|---|
| First line | SUB R0,R1 |
| Second line | BNE label 1 |
| Third line | Instruction 1 |
| Fourth line | JMP label 2 |
| Fifth line | label 1: Instruction 2 |
| Sixth line | label 2: Instruction 3 |

FIG. 33
(PRIOR ART)

| First line | SUB R0,R1 |
| Second line | MOVIFZF R2,R4 |
| Third line | MOVIFNZF R3,R4 |
| Fourth line | ADD R5,R6 |

FIG. 34
(PRIOR ART)

DATA PROCESSING DEVICE THAT CONTROLS AN OVERRIDING OF A SUBSEQUENT INSTRUCTION IN ACCORDANCE WITH A CONDITIONAL EXECUTION STATUS UPDATED BY A SEQUENCER

BACKGROUND OF THE INVENTION

1. Field of the Invention

The present invention relates to data processing devices that execute instructions conditionally, and in particular to a technology providing data processing devices and program conversion devices with high processing efficiency due to pipelining, in which problems do not occur such as a decreased freedom of allocation of instructions and an increase of the program memory capacity due to an increase of the instruction code length.

2. Description of the Related Art

In data processing, processes are often selected depending on conditions that arise during execution, regardless of the application of the data processing to, for example, scientific and engineering calculation and control. FIG. 32 shows a flowchart of a case-handling process. FIG. 32 is an example in which a process is selected depending on the state of the processor, which is a very common data process. First, an arithmetic computation is executed at Step 1001, and then, at Step 1002, it is judged whether the computation result of Step 1001 is zero. If the result of this judgment is that the computation result is not zero, the procedure advances to Step 1004, where a process 2 is executed, and if the result of the judgment at Step 1002 is that the computation result is zero, the procedure advances to Step 1003, where a process 1 is executed. Then, the procedure advances to Step 1005.

FIG. 33 is an example of an assembly machine program, in which the process of FIG. 32 is performed by a conditional branching instruction. First, a subtraction is carried out in the first line. At the same time, the processor generates a processor status expressing the nature of the result of the computation. For example, the processor status includes a carry flag indicating that a carry over occurred, a negative flag indicating that the result is negative, an overflow flag indicating that the result exceeded the expressible data range, and a zero flag indicating that the result is zero. The following second line contains a conditional branching instruction depending on the zero flag. If the zero flag is 1, then the instruction 1 on the third line is executed, the program branches at the fourth line unconditionally to a label 2, and the instruction 3 at the sixth line is executed. If the zero flag is 0, then the instruction at the third line is not executed but skipped by branching to the fifth line, which is marked by a label 1, and the instructions 2 and 3 are executed in that order.

In this conventional technology, if there is conditional branching, then there is the problem that in processors performing pipelining, which is a common approach to increase processor throughput, the processing efficiency may decrease due to pipeline stalls caused by the branching. A countermeasure is to use conditionally executed instructions in order to cut down the number of branching instructions.

FIG. 34 lists an assembly language program carrying out the process flow of FIG. 32 with conditionally executed instructions. This program is listed in assembler mnemonic notation. With the [SUB R0, R1] of the first line, the value of the register R1 is subtracted from the value of the register R0, and the result is stored in the register R1. If the result of this computation is zero, then the zero flag is set to 1, and if it is not zero, then the zero flag is set to 0. With the [MOVIFZF R2, R4] of the second line, if the zero flag is 1, then the value of the register R2 is stored in the register R4. With the [MOVIFNZF R3, R4] of the third line, if the zero flag is 0, then the value of the register R3 is stored in the register R4. With the [ADD R5, R6] of the fourth line, the value of the register R6 is added to the value of the register R5, and the result is stored in the register R6. Here, the instructions of the second line and the third line are conditionally executed instructions. FIG. 35 shows the instruction format of conditionally executed instructions. Conditionally executed instructions are expressed by an execution code 41 and a condition specifying field 40. For example, when taking true or false for the four kinds of status flags as the condition for execution, then the condition specifying field 40 can be expressed by three bits. The instruction is executed only if the conditionally executed instruction matches the condition of the condition specifying field 40, and is not executed if the conditionally executed instruction does not match the condition of the condition specifying field 40. Here, the information whether the instruction is executed unconditionally, whether it is a conditionally executed instruction, or which condition is used becomes clear when the individual instructions are decoded. Therefore, the processor also decodes instructions that are eventually not executed.

The following problems occur with regard to data processing with conditionally executed instructions according to the above-described conventional technology.

When selecting a process in accordance with a certain condition, instructions executed under contradictory conditions often are arranged successively in the program, and often are in a mutually exclusive relation. Case-handling programs that execute one of a plurality of successive processes depending on a certain condition and do not perform the other ones, are used in many situations of microprocessor control, and in these situations, one of the conditionally executed instructions is never executed. Moreover, if the program contains conditionally executed instructions, in which the subsequent process chain is executed only if a certain condition is satisfied and the subsequent process chain is skipped if this condition is not satisfied, then the subsequent process chain is not executed if the condition is not satisfied. In those cases, a pipeline flush is carried out in the microprocessor, and the data processing efficiency is decreased.

Furthermore, in order to provide the conditionally executed processes with a certain degree of freedom, it is necessary to allot code for and define many types of individual instructions as conditionally executed instructions, so that it inevitably becomes difficult to keep the code length short.

SUMMARY OF THE INVENTION

In view of these problems, it is an object of the present invention to provide a data processing device executing conditional instructions as well as a program conversion device, with which the processing efficiency can be increased without causing such problems as a decreased freedom of allocation of instructions and an increase of the program memory capacity due to an increase of the instruction code length.

To achieve this object, a first data processing device of the present invention, which reads in and executes instructions in a certain sequence, includes:

a fetch portion for reading in a computational instruction;

a decoding portion for decoding the computational instruction that has been read in;

an execution portion for executing the decoded computational instruction; and an instruction overriding control circuit that overrides, of one or a plurality of subsequent instructions that follow the computational instruction in said sequence and are associated with the computational instruction, all but one of the subsequent instructions, in accordance with an execution result of the computational instruction.

With this configuration, all but one of the subsequent instructions are overridden in accordance with an execution result of the previous computational instruction, and there is no need to decode instructions that are not executed, which improves the processing efficiency. Furthermore, it is not necessary to allocate code for and define individual instructions as conditional execution instructions, so that such problems as a decreased freedom of allocation of instructions and an increase of the program memory capacity due to an increase of the instruction code length do not occur.

In the first data processing device of the present invention, it is preferable that the one or plurality of subsequent instructions is a subsequent instruction group including a plurality of instruction strings.

With this configuration, the present invention also can be applied when several of the subsequent instructions form a module of a group of a plurality of instructions. A first program conversion device of the present invention, which reads in a descriptive program and converts it into a machine language program, includes:

an instruction detection portion for detecting from instruction strings of the descriptive program an instruction involving a condition or decision; and an instruction rewriting portion for rewriting a condition/decision instruction detected by the instruction detection portion into instruction strings including a computational instruction and one or a plurality of subsequent instructions following the computational instruction and associated with the computational instruction.

With this configuration, it is possible to obtain a machine language program that is suitable for the data processing device of the present invention by rewriting a program that is notated in one of the commonly used program notations.

In the first program conversion device of the present invention, it is preferable that the one or plurality of subsequent instructions is a subsequent instruction group including a plurality of instruction strings.

With this configuration, it is possible to obtain a machine language program used for the data processing device of the present invention when several of the subsequent instructions form a module of a group of a plurality of instructions. A second data processing device of the present invention, which reads in and executes instructions in a certain sequence, includes an instruction memory, a fetch portion, a decoding portion, an instruction execution portion, and an instruction overriding control portion, wherein the instruction memory stores a first subsequent instruction corresponding to a first conditional instruction from which the first condition has been eliminated, a second subsequent instruction corresponding to a second conditional instruction from which the second condition has been eliminated, and a command instruction that is arranged prior to the first subsequent instruction and the second subsequent instruction in the instruction sequence, and that designates that the first subsequent instruction and the second subsequent instruction have contradictory execution conditions, and that indicates the contradictory execution conditions generated from the first condition and the second condition;

wherein the fetch portion fetches the command instruction from the instruction memory;

wherein the decoding portion decodes the fetched command instruction;

wherein the instruction execution portion executes the decoded command instruction; and wherein the instruction overriding control portion checks the execution result of the instruction command to determine which of the first condition and the second condition is satisfied, and overrides the instruction of the first subsequent instruction and the second subsequent instruction for which the condition is not satisfied.

With this configuration, the overriding control portion executes only one of two subsequent instructions and overrides the other one, based on the result of the execution of a command instruction, thus realizing so-called exclusive control.

In the second data processing device of the present invention, it is preferable that the first conditional instruction, the second conditional instruction, the first subsequent instruction and the second subsequent instruction each consist of one instruction or an instruction group including a plurality of instruction strings.

With this configuration, the present invention also can be applied when the first conditional instruction, the second conditional instruction, the first subsequent instruction and the second subsequent instruction are either single instructions or modules of instruction groups including a plurality of instructions, or combinations thereof.

A second program conversion device of the present invention for reading in a descriptive program and converting it into a machine language program includes:

a first instruction detection portion for detecting from instruction strings of the descriptive program an instruction for which there is a possibility that a state of a processor is updated;

a second instruction detection portion for detecting from the entered instruction strings a conditional instruction that is executed depending on a state of the processor;

a first judgment portion for judging whether a first conditional instruction and a second conditional instruction that have been detected by the second instruction detection portion are arranged successively after an instruction detected by the first instruction detection portion;

a second judgment portion for judging whether the execution conditions of the first conditional instruction and the second conditional instruction contradict one another.

a command instruction retrieval portion for retrieving from the machine language instruction code a command instruction, which indicates the same process execution as the instruction detected by the first instruction detection portion, and which indicates that the subsequent first conditional instruction and second conditional instruction are executed at contradictory conditions; and an instruction rewriting portion for rewriting an instruction string detected by the first instruction detection portion and the second instruction portion into a first subsequent instruction corresponding to the first conditional instruction from which the first condition has been eliminated, a second subsequent instruction corresponding to the second conditional instruction from which the second condition has been eliminated, and the command instruction.

With this configuration, it is possible to obtain a machine language program that is suitable for the data processing device of the present invention by rewriting a program that is notated in one of the commonly used program notations into a command instruction and a first and a second subsequent instruction.

In the second program conversion device of the present invention, it is preferable that the first conditional instruction, the second conditional instruction, the first subsequent instruction and the second subsequent instruction each consist of one instruction or an instruction group including a plurality of instruction strings.

With this configuration, it is possible to obtain a machine language program as used for the data processing device the present invention when the first conditional instruction, the second conditional instruction, the first subsequent instruction and the second subsequent instruction are either single instructions or modules of instruction groups including a plurality of instructions, or combinations thereof.

A third data processing device of the present invention for reading in and executing instructions in a certain sequence includes:

a fetch portion for reading in a computational instruction;

a decoding portion for decoding the computational instruction that has been read in;

an execution portion for executing the decoded computational instruction; and an instruction overriding control circuit which decides, in accordance with an execution result of the computational instruction, whether to override a subsequent instruction that follows the computational instruction in said sequence and is associated with the computational instruction, and which overrides this subsequent instruction in accordance with that decision.

This configuration can control whether to override a subsequent instruction in accordance with an execution result of the previous computational instruction, and there is no need to decode instructions that are not executed, which improves the processing efficiency. Furthermore, it is not necessary to allocate code for and define individual instructions as conditional execution instructions, so that such problems as a decreased freedom of allocation of instructions and an increase of the program memory capacity due to an increase of the instruction code length do not occur.

In the third data processing device of the present invention, it is preferable that the subsequent instruction is a subsequent instruction group including a plurality of instruction strings.

With this configuration, the present invention also can be applied when a plurality of the subsequent instructions form a module of a group of instructions. A third program conversion device of the present invention reads in and executes instructions in a certain sequence and includes:

an instruction detection portion for detecting from instruction strings of the descriptive program an instruction involving a condition or decision; and an instruction rewriting portion for rewriting a condition/decision instruction detected by the instruction detection portion into instruction strings including a computational instruction and a subsequent instruction following the computational instruction and associated with the computational instruction.

With this configuration, it is possible to obtain a machine language program that is suitable for the third data processing device of the present invention by rewriting a program that is notated in one of the commonly used program notations.

In the third program conversion device of the present invention, it is preferable that the subsequent instruction is a subsequent instruction group including a plurality of instruction strings.

With this configuration, it is possible to obtain a machine language program used for the data processing device of the present invention when several of the subsequent instructions form a module of a group of a plurality of instructions. A fourth data processing device of the present invention reading in and executing instructions in a certain sequence includes an instruction memory, a fetch portion, a decoding portion, an instruction execution portion, and an instruction overriding control portion, wherein the instruction memory stores a subsequent instruction corresponding to a conditional instruction from which the condition has been eliminated, and a subsequent execution condition command instruction that is arranged prior to the subsequent instruction in the instruction sequence, and that indicates that the subsequent instruction has an execution condition, and that indicates that execution condition;

wherein the fetch portion fetches the subsequent execution condition command instruction from the instruction memory;

wherein the decoding portion decodes the fetched subsequent execution condition command instruction;

wherein the instruction execution portion executes the decoded subsequent execution condition command instruction; and wherein the instruction overriding control portion checks the execution result of the subsequent execution condition command instruction to determine whether the execution condition is satisfied, and overrides the subsequent instruction if the condition is not satisfied.

With this configuration, the overriding control portion executes or overrides the subsequent instruction in accordance with the result of the execution of a command instruction, thus realizing so-called exclusive control.

In the fourth data processing device of the present invention, it is preferable that the conditional instruction and the subsequent instruction each include an instruction group including a plurality of instruction strings.

With this configuration, the present invention also can be applied when the subsequent instruction is a module including an instruction groups of a plurality of instructions.

A fourth program conversion device of the present invention for reading in a descriptive program and converting it into a machine language program includes:

a first instruction detection portion for detecting from instruction strings of the descriptive program an instruction for which there is a possibility that a state of a processor is updated;

a second instruction detection portion for detecting from the entered instruction strings a conditional instruction that is executed depending on a state of the processor;

a first judgment portion for judging whether there is an instruction detected by the second instruction detection portion that follows an instruction detected by the first instruction detection portion;

a command instruction retrieval portion for retrieving from the machine language instruction code a subsequent execution condition command instruction, which indicates the same process execution as the instruction detected by the first instruction detection portion, and which indicates the execution condition of the subsequent conditional instruction; and an instruction rewriting portion for rewriting an instruction string detected by the first instruction detection portion and the second instruction portion into (a) a condition hiding instruction corresponding to the conditional instruction from which the condition has been eliminated and (b) the subsequent execution condition command instruction.

With this configuration, it is possible to obtain a machine language program that is suitable for a data processing device of the present invention by rewriting a program that is notated in one of the commonly used program notations into command instructions and subsequent instructions whose execution or overriding is controlled by the result of the computation of the command instructions.

In the fourth program conversion device of the present invention, it is preferable that the conditional instruction and the subsequent instruction each include an instruction group including a plurality of instruction strings.

With this configuration, it is possible to obtain a machine language program used for a data processing device of the present invention when the subsequent instruction forms a module of a group of instructions. In the data processing devices of the present invention, it is preferable that the instruction overriding control portion lets the fetch portion skip the reading in of the subsequent instruction that is overridden.

With this configuration, the overridden instructions can be skipped in accordance with the control of the instruction overriding control portion, and the processing efficiency can be prevented from decreasing, because the overridden instruction is sent to the decoding portion but the decoding process is not carried out.

BRIEF DESCRIPTION OF THE DRAWINGS

FIG. 4 shows an operation timing chart of the processor in the first embodiment of the present invention.

FIG. 5 shows a machine language program 1 using a command instruction of the first embodiment of the present invention.

FIG. 7 shows an example of a not-yet-rewritten assembly language program of the second embodiment of the present invention.

FIG. 8 shows a machine language program after rewriting with the second embodiment of the present invention.

FIG. 12 shows a machine language program 2 using a command instruction of the third embodiment of the present invention.

FIG. 13 shows an operation timing chart of the processor in the third embodiment of the present invention.

FIG. 14 shows an example of a first not-yet-rewritten assembly language program of the fourth embodiment of the present invention.

FIG. 15 shows an example of a second not-yet-rewritten assembly language program of the fourth embodiment of the present invention.

FIG. 18 shows a machine language program 3 using a command instruction of the fifth embodiment of the present invention.

FIG. 19 shows an operation timing chart of the processor in the fifth embodiment of the present invention.

FIG. 21 shows an example of a not-yet-rewritten assembly language program of the sixth embodiment of the present invention.

FIG. 24 shows a machine language program 4 using a command instruction of the seventh embodiment of the present invention.

FIG. 25 shows an operation timing chart of the processor in the seventh embodiment of the present invention.

FIG. 26 shows an example of a not-yet-rewritten assembly language program of the eighth embodiment of the present invention.

FIG. 30A shows the instruction overriding control process, FIG. 30B shows the conditional execution status transition chart for the ninth embodiment of the present invention, and FIG. 30C is a status table showing the states of the instruction pre-fetch control signal in the ninth embodiment of the present invention.

FIG. 31 shows an operation timing chart of the processor in the ninth embodiment of the present invention.

FIG. 33 shows an assembly language program with a conventional branching instruction.

FIG. 34 shows an assembly language program with a conventional conditional execution instruction.

DESCRIPTION OF THE PREFERRED EMBODIMENTS

The following is a description of the preferred embodiments of the present invention, with reference to the accompanying drawings.

First Embodiment

The data processing device according to the first embodiment of the present invention represents a first and a second data processing device of the present invention. The data processing device of this first embodiment overrides one of the two subsequent instructions that follow a computational instruction, using an instruction override control circuit.

The following is a description of the first embodiment, with reference to the FIGS. 1, 2, 3, 4 and 5. It should be noted that in the following, numbers are sometimes given as hexadecimal numbers in the form of "x'00", "x'01", etc.

Figure 1:
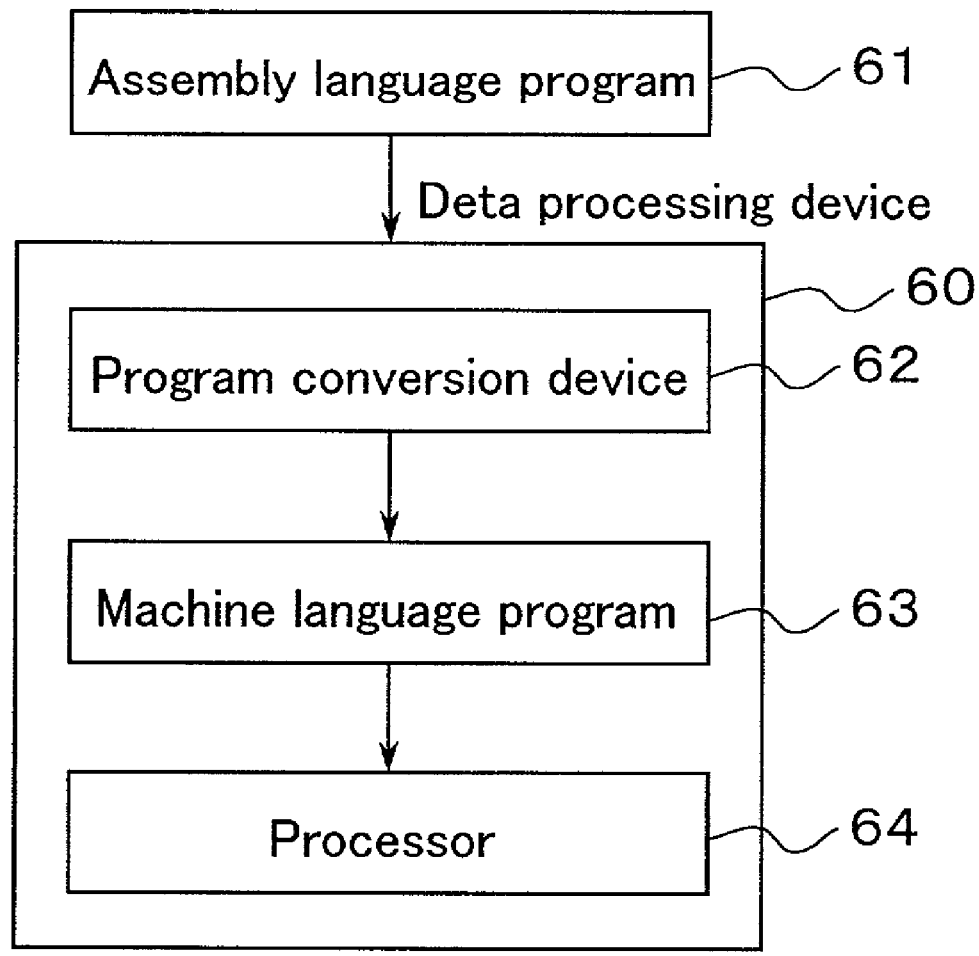
FIG. 1 is a diagram schematically showing the configuration of a data processing device of the present invention.

FIG. 1 is a diagram schematically showing the configuration of a data processing device 60. The data processing device 60 includes a program conversion device 62 for entering an assembly language program 61 and converting it into a machine language program 63, and a processor 64 that operates in accordance with the machine language program 63. The processor 64 has a three-stage pipeline structure, including an instruction fetching stage (referred to in short as "IF stage" in the following), a decode and read register stage (referred to in short as "DEC stage" in the following), and an execution stage performing a plurality of processes, such as carrying out a calculation, memory accessing, and rewriting registers (referred to in short as "EX stage" in the following)

Figure 2:
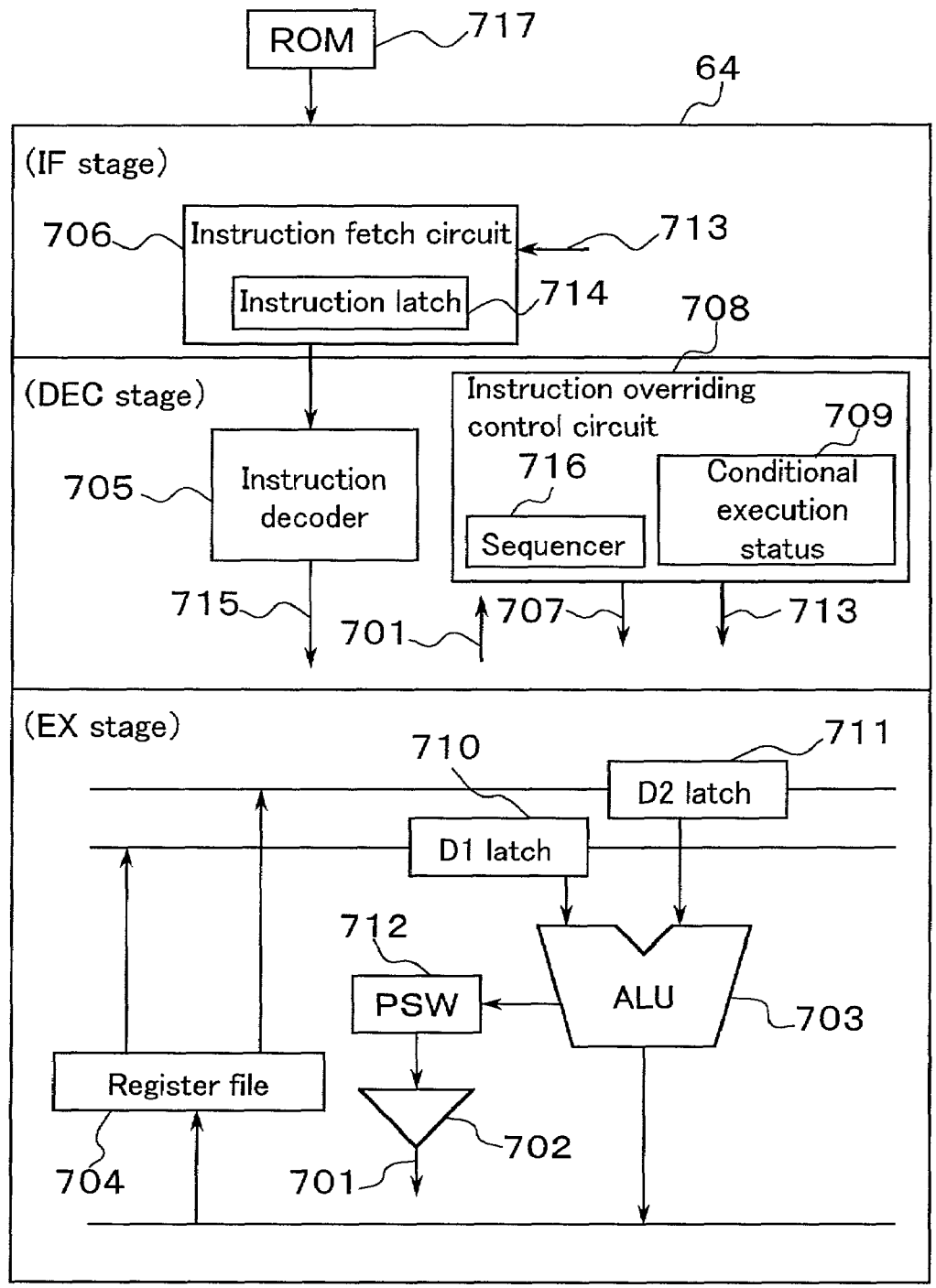
FIG. 2 is a block diagram showing the configuration of a processor in the present invention.

FIG. 2 is a block diagram showing the configuration of the processor 64. Numeral 717 denotes a ROM in which a machine language program 63 is stored. Numeral 706 denotes an instruction fetch circuit for fetching instructions stored on the ROM. Numeral 714 denotes an instruction latch, in which fetched instructions are stored. Numeral 705 denotes an instruction decoder for decoding instructions fetched with the instruction fetch circuit 706 and controlling the portions of the processor 64. Numeral 715 denotes a pipeline control signal for controlling the pipeline. Numeral 708 denotes an instruction overriding control circuit 708, which controls the execution and overriding of instructions, as well as the operation of the pipeline. Numeral 709 denotes a conditional execution status, representing the operating state of a conditional execution. Numeral 707 denotes an instruction overriding signal, which overrides an instruction. Numeral 716 denotes a sequencer, which updates the conditional execution status in accordance with an instruction decoding operation. Numeral 704 denotes a register file 704 storing addresses specifying operand data or operands. The register file 704 is made, for example, of eight registers R0 to R7. The register length is 32 bit. Numeral 703 denotes an ALU (arithmetic and logic unit) performing arithmetic and logical computations. The result of the arithmetic and logical computations is given by a processor status word (PSW) 712, which represents the resulting processor state. Numeral 702 denotes a selector for preemptively selecting one processor status with a command instruction of the present invention and forwarding it to the instruction overriding control circuit 708. Numeral 701 denotes an exclusive condition selected by the selector 702. Numerals 710 and 711 denote a D1 latch and a D2 latch for latching data that are subject to computation. Numeral 713 denotes an instruction pre-fetch control signal controlling the pre-fetching of an instruction.

Figures 3A, 3B:
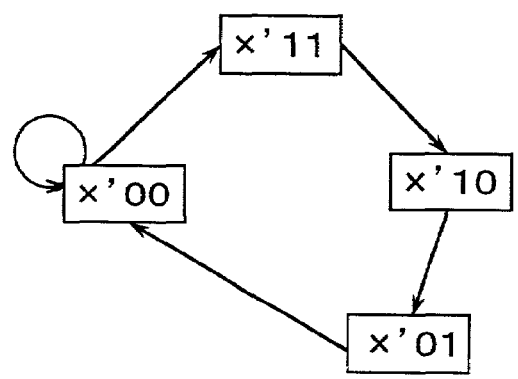
FIG. 3A shows the instruction overriding control process and FIG. 3B shows a conditional execution status transition chart for the first embodiment of the present invention.

FIG. 3 shows the instruction overriding control process and a conditional execution status transition chart in accordance with the first embodiment of the present invention. First, the transition of the conditional execution status 709 is described with reference to FIG. 3. FIG. 3A lists whether the instruction overriding control circuit 708 overrides or executes the processing of the EX stage (instruction overriding signal 707). The exclusive condition 701 in FIG. 3A denotes the processor status selected by the command instruction of the present invention and takes on the binary value 0 or 1. The conditional execution status 709 in FIG. 3A similarly represents the state during the conditional execution of the subsequent instruction, with the command instruction of the present invention. For example, if the exclusive condition 701 is "1" and the conditional execution status 709 is "x'01", an instruction override signal 707 is generated, and the processing of the EX state is overridden. Here, it is assumed that when the instruction override signal 707 is "1", the processing of the EX state is overridden, and when the instruction override signal 707 is "0", the processing of the EX state is executed.

FIG. 3B is a transition chart of the conditional execution status 709, controlled by the sequencer 716. The conditional execution status 709 is set from "x'00" to "x'11" when a command instruction is decoded, and in accordance with the clock advancing the pipeline processing, it is updated to "x'10" when the subsequent instruction is decoded at the next DEC stage and passes to the next DEC stage. This conditional execution status 709 is further updated from "x'10" to "x'01" and from "x'01" to "x'00", in accordance with the decoding of the subsequent instruction. This means, the sequencer 716 sets the conditional execution status 709 from its initial value "x'00" to "x'11" after the command instruction has been decoded, and when the next instruction is decoded, it is decremented by "x'1" and finally transitioned to "x'00".

That is to say, as shown in FIG. 3B, the conditional execution status transitions in the order "x'11", "x'10", "x'01" and "x'00", whereby, if the exclusive condition is "0", the instruction 2 in the second line (for which the conditional execution status is "x'10") is overridden and not executed whereas, if the exclusive condition is "0", the instruction 3 in the third line (for which the conditional execution status is "x'01") is overridden and not executed, so that depending on the exclusive condition and the conditional execution status, either the instruction 2 or the instruction 3 is overridden.

The foregoing is a configuration example of a first and a second data processing device of the present invention.

The following describes an example of the operation of the first and the second data processing device of the present invention. As an example, the operation for executing the machine language program 1 shown in FIG. 5 is explained. FIG. 5 represents the machine language program 1, which is notated mnemonically for illustrative reasons. The following is a simple explanation of the instructions of the machine language program 1.

Machine Language Program 1

---

First line: SUBIFEZF R0, R1    (subtract the value of the register R1 from the value of the register R0 and store the result in the register R1.

-continued

Furthermore, this instruction indicates that the subsequent two instructions are exclusive conditionally executed instructions with the zero flag of the processor status as the condition.)

Second line: MOV R2, R4 (store the value of the register R2 in the register R4)
Third line: MOV R3, R4 (store the value of the register R3 in the register R4)
Fourth line: ADD R5, R6 (add the value of the register R5 to the value of the register R6 and store the result in the register R6.)

In this machine language program 1, the command instruction SUBIFEZF of the first line is an exclusive conditional instruction effecting execution of only one of the subsequent two instructions. As will be explained below, the state of the zero flag is determined by the result of the computational execution of SUBIFEZF, and depending on the state of the exclusive condition 701 indicated by this zero flag and the state of the conditional execution status 709, either the instruction 2 of the second line or the instruction 3 of the third line is executed exclusively.

FIG. 4 shows an operation timing chart of the processor 64. FIG. 4 illustrates the operation when executing the machine language program 1 of FIG. 5, illustrating the timing of the instructions processed at the IF stage, the DEC stage and the EX stage of the pipeline in so-called machine cycles. For example, instruction 1 in FIG. 5 is processed while sequentially passing through the pipeline stages from the timing t1 to t3. Such a flow of instructions is usually called pipeline streaming. As shown in FIG. 4, the instruction overriding control circuit 708 is operated in accordance with the timing expressed by the first half (for example timing t11) and the second half (timing t12) of the stages. In particular in the DEC stage, the conditional execution status 709 is updated by the instruction overriding control circuit 708 at the second half of the timing. At the first half of the timing in the EX stage, it is decided in accordance with the instruction overriding signal 707 whether the execution of the instruction begins or whether the instruction is overridden. The following is an explanation of the operations at each timing, in their temporal order. Here, it is assumed that "x'0001" has been stored in both the registers R0 and R1, "x'0002" has been stored in R2, and "x'0003" has been stored in R3.

Timing t1

IF stage: instruction 1 [SUBIFEZF R0, R1]

Timing t11: Instruction 1 is read out from the ROM 717, and is stored in the instruction latch 714.

Timing t2

DEC stage: instruction 1 [SUBIFEZF R0, R1]

Timing t21: Instruction 1, which has been stored in the instruction latch 714, is decoded by the instruction decoder 705. Register R0 is read out and "x'0001" is stored in the D1 latch 710. Register R1 is read out and "x'0001" is stored in the D2 latch 711.

Timing t22: The instruction overriding control circuit 708 sets the conditional execution status 709 from "x'00" to "x'11". The zero flag is selected by the selector 702 as the register expressing the value of the exclusive condition 701.

IF stage: instruction 2 [MOV R2, R4]

Timing t21: Instruction 2 is read from the ROM 717 and stored in the instruction latch 714.

Timing t3

EX stage: instruction 1 [SUBIFEZF R0, R1]

Timing t31: The instruction overriding signal 707 stays in its initial state "0", the EX stage is executed, and the execution of instruction 1 begins. The values stored in the D1 latch 710 and the D2 latch 711 are subtracted by the arithmetic and logic unit 703. Here, the value "x'0001" is stored both in the D1 latch 710 and the D2 latch 711, so that "x'0000" is stored as the result of the subtraction in the register R1. As a result, "1" is stored in zero flag, and the exclusive condition 701 goes from "0" to "1".

DEC stage: instruction 2 [MOV R2, R4]

Timing t31: The instruction 2 stored in the instruction latch 714 is decoded with the instruction decoder 705, register R2 is read out, and the value "x'0002" is stored in the D1 latch 710.

Timing t32: The instruction overriding control circuit 708 updates the conditional execution status 709 from "x'11" to "x'10".

IF stage: instruction 3 [MOV R3, R4]

Timing t31: Instruction 3 is read from the ROM 717 and stored in the instruction latch 714.

Timing t4

EX stage: instruction 2 [MOV R2, R4]

Timing t41: Because the instruction overriding signal 707 is "0", the execution of instruction 2 begins. The value stored in the D1 latch 710 is read out, passed through the arithmetic and logic unit 703, passed through the arithmetic and logic unit 703, and stored in the register R4. Thus, in this example, of the subsequent instructions, instruction 2 is executed.

DEC stage: instruction 3 [MOV R3, R4]

Timing t41: The instruction 3 stored in the instruction latch 714 is decoded with the instruction decoder 705, the register R3 is read out, and "x'0003" is stored in the D1 latch 710.

Timing t42: The instruction overriding control circuit 708 updates the conditional execution status 709 from "x'10" to "x'01". Because the conditional execution status now is "x'01" and because the exclusive condition is "1", the instruction overriding control circuit 708 generates an instruction overriding signal 707 in accordance with FIG. 3A, and the instruction overriding signal 707 is updated from "0" to "1".

IF stage: instruction 4 [ADD R5, R6]

Timing t41: Instruction 4 is read from the ROM 717 and stored in the instruction latch 714.

Timing t5

EX stage: instruction 3 [MOV R3, R4]

Timing t51: Because the instruction overriding signal 707 is "1", the EX stage is not executed, and instruction 3 is overridden. Thus, in this example, of the subsequent instructions, instruction 2 is executed, whereas instruction 3 is overridden and not executed.

DEC stage: instruction 4 [ADD R5, R6]

Timing t51: The instruction 4 stored in the instruction latch 714 is decoded with the instruction decoder 705, the register R5 is read out, and "x'0005" is stored in the D1 latch 710. The register R6 is read out, and "x'0006" is stored in the D2 latch 711.

Timing t52: The instruction overriding control circuit 708 updates the conditional execution status 709 from "x'01" to "x'00". Here, because the conditional execution status is "x'00" and the exclusive condition is "1", the instruction overriding control circuit 708 updates the instruction overriding signal 707 from "1" to "0", in accordance with FIG. 3A.

IF stage: instruction 5 [NOP]

Timing t51: Instruction 5 is read from the ROM 717 and stored in the instruction latch 714.

Timing t6

EX stage: instruction 4 [ADD R5, R6]

Timing t61: Because the instruction overriding signal 707 is "0", the EX stage is executed, and instruction 4 is executed. The values stored in the D1 latch 710 and the D2 latch 711 are added by the arithmetic and logic unit 703, and then the sum is stored in the register R6.

DEC stage: instruction 5 [NOP]

Timing t61: The instruction 5 stored in the instruction latch 714 is decoded with the instruction decoder 705. Since it is a NOP instruction, no execution is carried out.

Timing t62: The instruction overriding control circuit 708 holds the conditional execution status 709 at "x'00".

IF stage: instruction 6 [NOP]

Timing t61: Instruction 6 is read from the ROM 717 and stored in the instruction latch 714.

Thus, with this first embodiment, the zero flag is selected as the exclusive condition 701 by instruction 1 [SUBIFEZF R0, R1], and the subsequent instructions are executed conditionally by setting the conditional execution status 709, and without adding a special condition specifying field. Moreover, specifying the subsequent instruction 2 and instruction 3 as exclusive conditionally executed instructions makes it possible to realize a case-handling process without causing pipeline stalls due to branching.

It should be noted that in the foregoing explanations, the register R0 and the register R1 had the same values, so that the value of the zero flag became "1", but also if the register R0 and the register R1 do not have the same values and the value of the zero flag becomes "0", an instruction overriding control can be performed by letting the instruction overriding control circuit 708 control the instruction overriding signal 707 in accordance with FIG. 3. In that case, of the subsequent instructions, the instruction 2 is overridden and not executed, whereas the instruction 3 is executed.

In the above-described example, the instruction 1 selects, from the processor status words 712, the zero flag as the instruction overriding signal 707, but there is no limitation to this, and it is also possible to select other processor status words 712.

Second Embodiment

As the second embodiment, a first and a second program conversion device in accordance with the present invention are explained with reference to FIGS. 6, 7, 8, 9 and 10.

Figure 6:
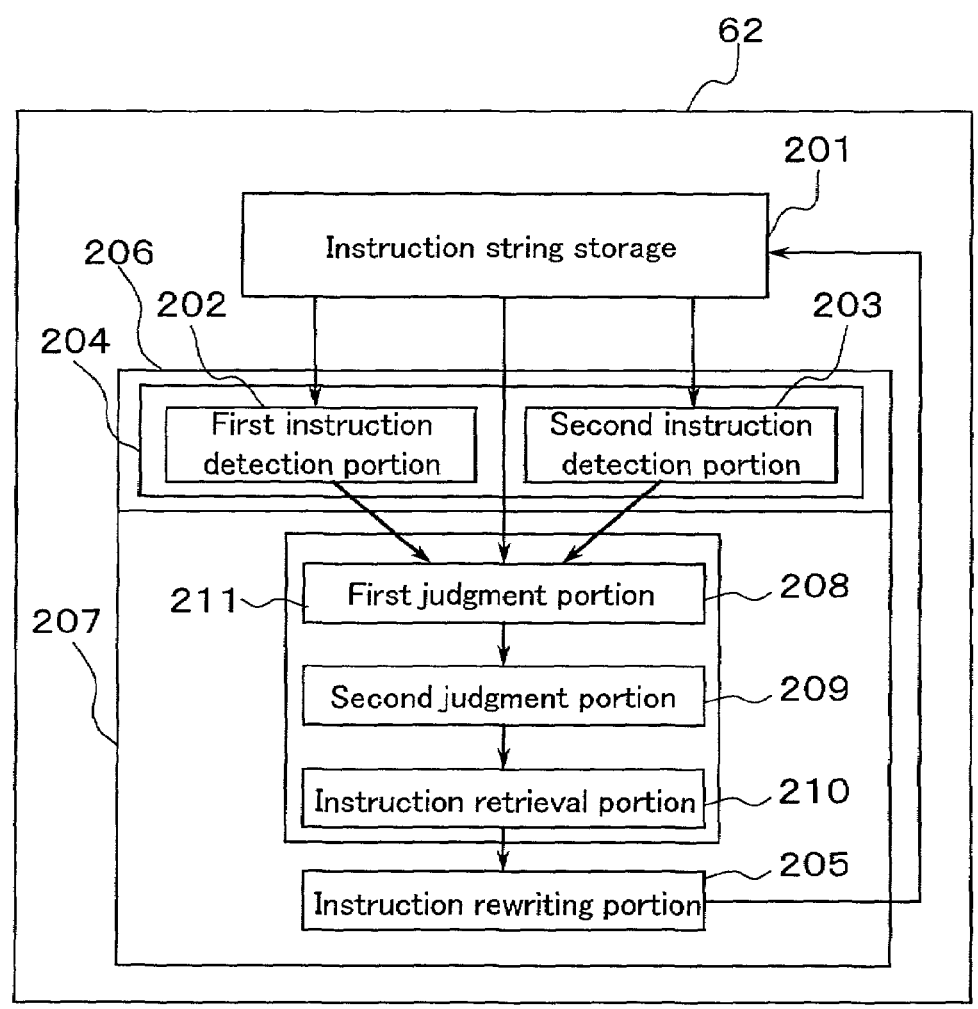
FIG. 6 is a diagram schematically showing the configuration of a program conversion device in accordance with the present invention.

FIG. 6 shows an example of the configuration of a program conversion device in accordance with the present invention. Numeral 201 denotes an instruction string storage for storing instruction strings. Numeral 204 denotes an instruction detection portion, which includes a first instruction detection portion 202 and a second instruction detection portion 203. The first instruction detection portion 202 detects whether an input instruction is an instruction that updates the processor status. The second instruction detection portion 203 detects whether an input instruction is a conditional instruction that is executed depending on the processor status. Numeral 208 denotes a first judgment portion, judging and storing whether an instruction detected by the second instruction detection portion is arranged immediately after an instruction detected by the first instruction detection portion. Numeral 209 is a second judgment portion, judging a condition of an instruction stored by the first judgment portion. Numeral 210 denotes an instruction retrieval portion for retrieving a command instruction, which can execute the same process as the instruction detected by the first instruction detection portion, and which indicates the condition judged with the second judgment portion. The instruction retrieval portion 210 stores all instructions that can be executed by the processor 64. Numeral 205 denotes an instruction rewriting portion for rewriting instruction strings. The program conversion device according to the second embodiment converts an assembly language program with a first process indicated by numeral 206 and a second process indicated by numeral 207. Numeral 211 denotes the first half of the second process 207.

The above is a configuration example of the first and the second program conversion device of the present invention.

The following describes an example of the operation of rewriting a program with a program conversion device of the second embodiment. FIG. 7 shows an example of a not-yet-rewritten assembly language program, in mnemonic notation. FIG. 8 shows a machine language program that has been rewritten from the program shown in FIG. 7 by the program conversion device of the second embodiment. However, in order to simplify the explanation of that machine language program, it is shown in mnemonic notation in FIG. 8. Here, both programs in mnemonic notation already have been explained for the above-described assembly language program and machine language program, and the only difference is that the operands (immediate values and registers) used for example in the ADD and MOV instructions are different, so that further explanations of the programs have been omitted.

Figure 9:
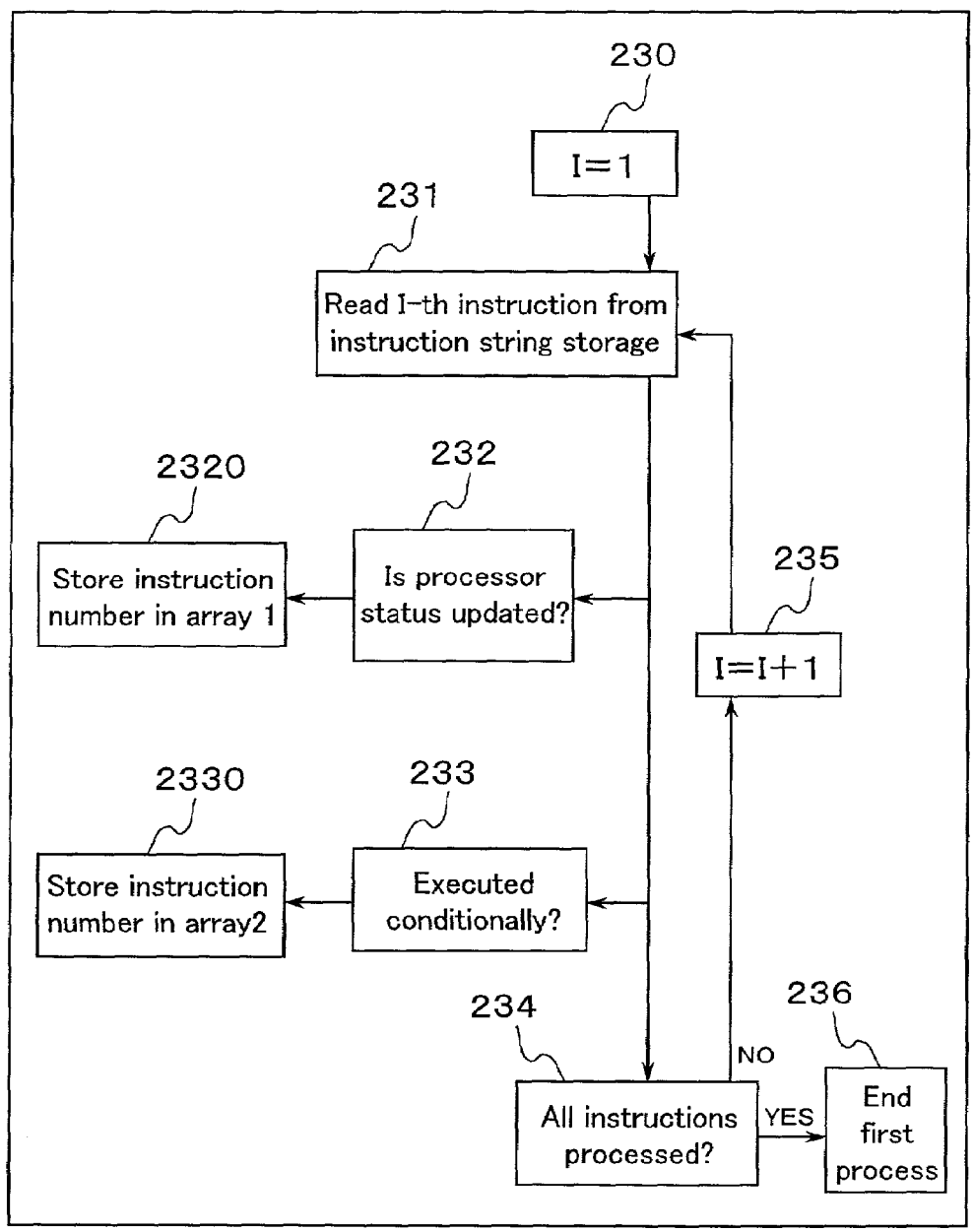
FIG. 9 is a flowchart showing a first process performed by a program conversion device in accordance with the second embodiment of the present invention.

FIG. 9 is a flowchart showing a first process performed by the program conversion device in accordance with the second embodiment of the present invention. This first process 206 is executed by the instruction detection portion 204, and instructions involving conditions or decisions can be detected with the instruction detection portion 204 from the instruction strings of the descriptive program. The process of the instruction detection portion 204 is carried out by the first instruction detection portion 202 and the second instruction detection portion 203.

At Step 231, the I-th instruction is read out from the instruction string storage 201. Steps 232 and 2320 are executed by the first instruction detection portion 202, which detects instructions for which there is a possibility that the processor status is updated, and stores the corresponding instruction number I in the detected order in an array 1. That is to say, processing these Steps 232 and 2320 accomplishes a first instruction detection portion for detecting from the instruction strings of the descriptive program instructions for which there is the possibility that the processor state is updated.

Next, Step 233 and Step 2330 are executed by the second instruction detection portion 203, which detects whether an instruction is executed conditionally, and stores the corresponding instruction number I in the detected order in an array 2. That is to say, processing these Steps 233 and 2330 accomplishes a second instruction detection portion for detecting from the instruction strings of the descriptive program conditional instructions, which are executed depending on the state of the processor.

Next, Step 234 judges whether all instructions have been processed. Step 235 increments I by 1, in order to process the next instruction number I. In this first process, the operation begins at Step 230, starting with the instruction number I=1, and ends when all instructions have been processed (which corresponds to Step 236).

With this first process, the first instruction detection portion and the second instruction detection portion can be accomplished.

Figure 10:
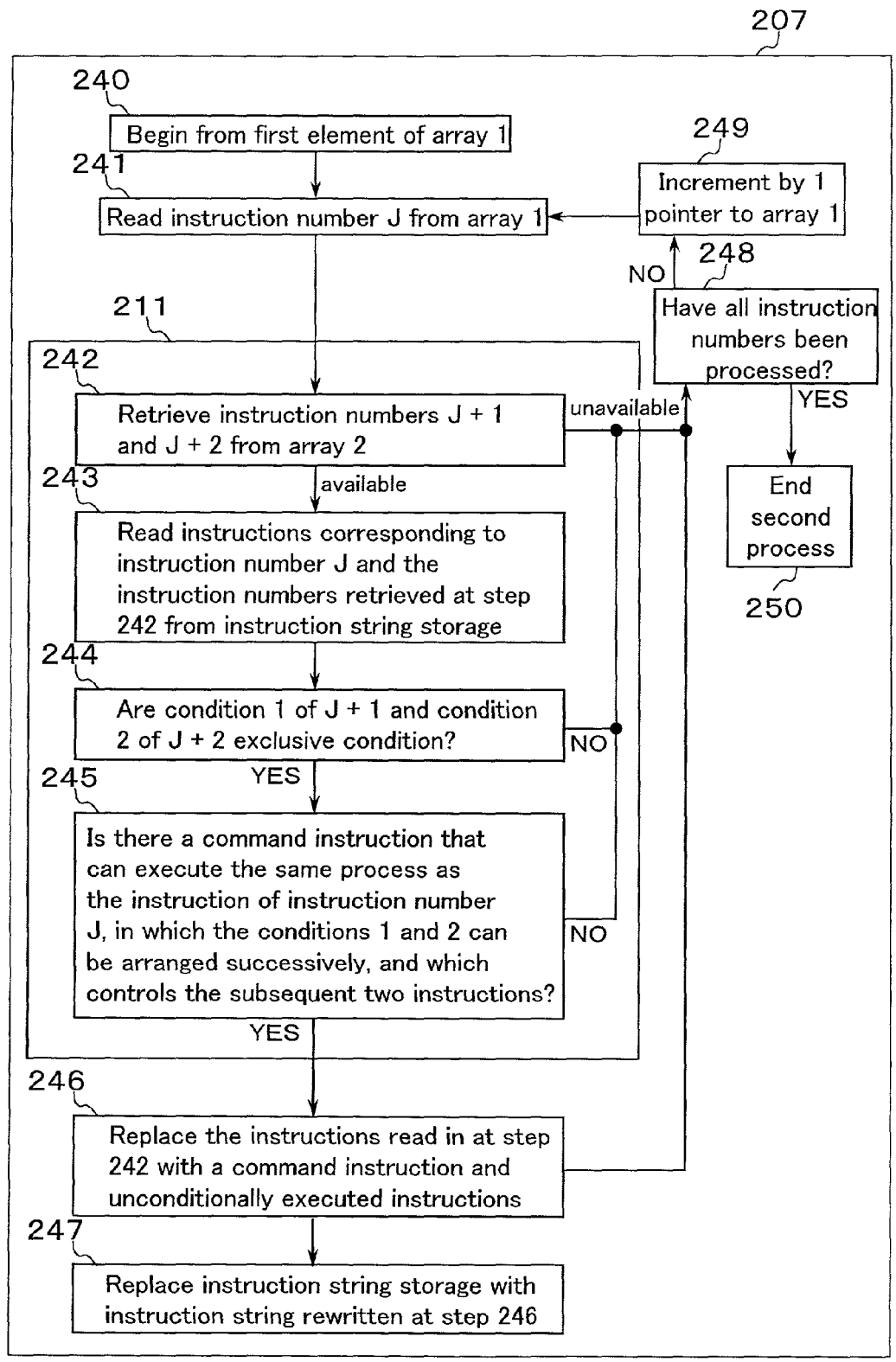
FIG. 10 is a flowchart showing the second process 207 performed by a program conversion device in accordance with the second embodiment of the present invention.

FIG. 10 is a flowchart showing the second process 207 performed by the program conversion device in accordance with the second embodiment of the present invention. This second process 207 accomplishes an instruction rewriting portion for rewriting condition/decision instructions detected by the first process 206 into instruction strings of a computational instruction and one or a plurality of subsequent instructions that follow this computational instruction and are associated with this computational instruction. This second process 207 is carried out by the first judgment portion 208, the second judgment portion 209, the instruction retrieval portion 210, and the instruction rewriting portion 205.

Step 241 reads one instruction number J from the array 1.

In Step 242, the first judgment portion 208 retrieves the instruction numbers J+1 and J+2 from the array 2. That is to say, Step 242 is a process that accomplishes the first judgment portion, which judges whether a first conditional instruction and a second conditional instruction that have been detected by the second instruction detection portion 203 follow successively after the instruction detected by the first instruction detection portion 202.

Step 243 reads out and stores instructions (retrieved at Step 241) with instruction number J and instructions (retrieved at Step 242) with instruction numbers J+1 and J+2 (here, instruction A, instruction B, and instruction C).

In Step 244, the second judgment portion 209 judges whether the conditions of the instruction B and the instruction C are exclusive conditions (referred to as "condition 1" and "condition 2" in the following). That is to say, this process accomplishes the second judgment portion 209, which judges whether the execution conditions of the first conditional instruction and the second conditional instruction contradict one another.

In Step 245, the instruction retrieval portion 210 judges whether there is a command instruction that can execute the same process as instruction A, in which the conditions 1 and 2 can be arranged successively, and which controls the subsequent two instructions. That is to say, this Step 245 accomplishes the command instruction retrieval portion, which retrieves from the machine language instruction code a command instruction that indicates the same process execution as the instruction detected by the first instruction detection portion 202, and that indicates that the subsequent first conditional instruction and second conditional instruction are executed under mutually contradictory conditions.

In Step 246, the instruction rewriting portion 205 rewrites the instructions read out at Step 242 with command instructions and unconditionally executed instructions.

Step 247 rewrites the instruction string storage with the instruction string rewritten at Step 246. That is to say, Step 246 and Step 247 accomplish the instruction rewriting portion, which rewrites the instruction strings detected by the first instruction detection portion 202 and the second instruction detection portion 203 into a first subsequent instruction, wherein the first conditional expression has been deleted from the first conditional instruction, a second subsequent instruction, wherein the second conditional expression has been deleted from the second conditional instruction, and a command instruction.

Step 248 judges whether all instruction numbers J stored in the array 1 have been processed. Step 249 incrementally increases by 1 the pointer to the array 1, in order to access the next instruction number J, and returns to Step 241. At Step 250, the process is terminated.

The following is a description (in the order of the first process 206 and the second process 207) of the procedure by which the not-yet-rewritten program in FIG. 7 is rewritten by the program conversion device of the second embodiment. It should be noted that the instruction of the first line is denoted as instruction (1), the instruction of the second line is denoted as instruction (2) etc., that is, with the line number in parentheses.

First Process 206

At Step 230, instruction (1) (ADD R5, R1) is set for I=1. At Step 231, instruction (1) (ADD R5, R1) is read from the instruction string storage 201. At Step 232, the first instruction detection portion 202 detects that the instruction (1) (ADD R5, R1) is an instruction for which there is the possibility that the processor status is updated, and the procedure advances to Step 2320, where 1 is stored in the first line of the array 1. At Step 233, the second instruction detection portion 203 does not detect that instruction (1) (ADD R5, R1) is a conditional instruction, so that the array 2 is not affected.

At Step 234, not all instructions have been processed, so that the instruction number is increased incrementally by 1 (Step 235), the procedure returns to Step 231, and instruction (2) (SUB R0, R1) is read from the instruction string storage 201. At Step 232, the first instruction detection portion 202 detects that the instruction (2) (SUB R0, R1) is an instruction for which there is the possibility that the processor status is updated, and the procedure advances to Step 2320, where 2 is stored in the second line of the array 1. At Step 233, the second instruction detection portion 203 does not detect that instruction (2) (SUB R0, R1) is a conditional instruction, so that the array 2 is not affected.

At Step 234, not all instructions have been processed, so that the instruction number is increased incrementally by 1 (Step 235), the procedure returns to Step 231, and instruction (3) (MOVIFZF R2, R4) is read from the instruction string storage 201. At Step 232, the first instruction detection portion 202 does not detect that the instruction (3) (MOVIFZF R2, R4) is an instruction for which there is the possibility that the processor status is updated, so that the array 1 is not affected. At Step 233, the second instruction detection portion 203 detects that instruction (3) (MOVIFZF R2, R4) is a conditional instruction, so that the procedure advances to Step 2330, where 3 is stored in the first line of the array 2.

At Step 234, not all instructions have been processed, so that the instruction number is increased incrementally by 1 (Step 235), the procedure returns to Step 231, and instruction (4) (MOVIFNZF R3, R4) is read from the instruction string storage 201. At Step 232, the array 1 is not affected by the first instruction detection portion 202, because the instruction (4) (MOVIFNZF R3, R4) is not an instruction for which there is the possibility that the processor status is updated. At Step 233, the second instruction detection portion 203 detects that instruction (4) (MOVIFNZF R3, R4) is a conditional instruction, so that the procedure advances to Step 2330, where 4 is stored in the second line of the array 2.

Then, by processing these same steps, 5 is stored in the third line of the array 1, and 7 is stored in the third line of the array 2. After that, for instruction (8) (MOV R6, R0), the procedure advances to Step 232 and Step 233, and after all instructions have been processed at Step 234, the first process 206 is terminated. In this situation, 1, 2, and 5 are stored in the array 1, whereas 3, 4, and 7 are stored in the array 2, and these numbers are used in the second process 207.

Second Process 207

Step 240: The process begins from the element in the first line of the array 1.

Step 241: The 1, which is the instruction number of the first line, is read out from the array 1 and stored in the variable J.

Step 242: The first judgment portion 208 retrieves the instruction numbers J+1 and J+2 from the array 2. Because now J=1, it is determined whether the instruction numbers for the instruction (2) and the instruction (3) are given. Here, the instruction number for J+1, that is for the instruction (2) is not given, so that the first judgment portion does not detect a fulfilled condition, and the procedure advances to Step 248.

Step 248: It is judged whether all instruction numbers of the array 1 have been processed. There are still instruction numbers left, so that the procedure advances to Step 249.

Step 249: The pointer to the array 1 is increased incrementally by 1, so as to process the next instruction number in the array 1.

Step 241: The 2, which is the instruction number of the second line, is read out from the array 1 and stored in the variable J.

Step 242: The first judgment portion 208 retrieves the instruction numbers of the variable J+1 and the variable J+2 from the array 2. Because now J=2, it is determined whether the instruction numbers for the instruction (3) and the instruction (4) are given. Here, both exist, so that the procedure advances to Step 243.

Step 243: The instructions corresponding to variable J, variable J+1, and variable J+2 are read from the instruction string storage, and stored as instruction A (SUB), instruction B (MOVIFZF), and instruction C (MOVIFNZF), respectively.

Step 244: The second judgment portion 209 judges whether the condition 1 of the instruction B and the condition 2 of the instruction C are exclusive conditions. Here, it is detected that when the state of the zero flag is "1", the instruction B is executed, whereas when the state of the zero flag is "0", the instruction C is executed, so that it is determined that the instructions B and C are exclusive conditions with contradictory conditions for the state of the zero flag. Moreover, the condition 1 is stored as "exclusive condition is 1" whereas the condition 2 is stored as "exclusive condition is 0". Then, the procedure advances to Step 245.

Step 245: The instruction retrieval portion 210 judges whether there is a command instruction that can execute the same process as instruction A, in which the conditions 1 and 2 can be arranged successively, and which controls the subsequent two instructions. Here, SUBIFEZF is a candidate, so that the procedure advances to Step 246.

Step 246: The instruction rewriting portion 205 rewrites the instruction A into SUBIFEZF. Furthermore, it rewrites the processes corresponding to the instructions B and C into instructions that are executed unconditionally. Here, instruction B is rewritten into MOV, and also instruction C is rewritten into MOV. Then, the procedure advances to Step 247.

Step 247: The instruction rewriting portion 205 rewrites the instructions corresponding to the variable J, the variable J+1, and the variable J+2 in the instruction string storage into the instruction A (SUBIFEZF), the instruction B (MOV) and the instruction C (MOV), respectively.

Step 248: It is determined whether all instruction numbers of the array 1 have been processed. There are still instruction numbers left, so that the procedure advances to Step 249.

Step 249: The pointer to the array 1 is increased incrementally by 1, so as to process the next instruction number in the array 1.

Step 241: The 5, which is the instruction number of the third line, is read out from the array 1 and stored in the variable J.

Step 242: The first instruction detection portion 202 retrieves the instruction numbers of the variable J+1 and the variable J+2 from the array 2. Because now J=5, it is determined whether the instruction numbers for the instruction (6) and the instruction (7) are given. Here, the instruction number 7 is given, but the instruction number 6 is not given, so that the procedure advances to Step 248.

Step 248: It is determined whether all instruction numbers of the array 1 have been processed. There are no more instruction numbers in the array 1, so that the procedure advances to Step 250.

Step 250: The second process 207 is terminated.

Thus, with this second embodiment, the instructions (2), (3) and (4) of FIG. 7, which shows the not-yet-rewritten program as stored in the instruction string storage 201, are rewritten into the instructions (2), (3) and (4) of FIG. 8.

The program conversion device of the second embodiment judges at Step 244 whether two conditions are exclusive, and judges at Step 245 whether it is possible to rewrite the instruction preceding those two instructions into a command instruction that causes an exclusive conditional execution of the subsequent two instructions. Thus, the program conversion device 62 can rewrite the instruction strings that are eventually stored in the command string storage 201 into instruction strings including command instructions effecting that a subsequent instruction 1 and an instruction 2 that follows instruction 1 are executed at contradictory conditions.

It should be noted that although an assembly language program was entered into the program conversion device of the second embodiment, it is also possible to devise the program conversion device such that a machine language program is input to generate a new machine language program.

Third Embodiment

The data processing devices of the third embodiment are examples of a first and a second data processing device of the present invention. In the first embodiment, the subsequent instruction was one instruction, whereas in the third embodiment, the subsequent instructions are a subsequent instruction group made up of a plurality of instruction strings.

The following describes the third embodiment of the present invention with reference to the FIGS. 1, 2, 11, 12, and 13. The third embodiment performs the conditional execution of a plurality of instruction strings, which do not indicate a condition for execution, by updating the conditional execution status 709. It should be noted that portions that are the same as in the first embodiment are denoted by like numerals, and their further explanation has been omitted.

The overall configuration of the data processing device of the third embodiment can be as in FIG. 1, and the configuration of the processor can be as in FIG. 2. The configuration of the data processing device and the processor can be as described in the first embodiment, so that further explanations have been omitted.

The instruction overriding control process and the transition of the conditional execution status 709 in accordance with this embodiment are described with reference to FIG. 11. FIG. 11A lists whether the instruction overriding control circuit 708 overrides the processing of the EX stage in accordance with the exclusive condition and the conditional execution status (instruction overriding signal 707). The exclusive condition 701 in FIG. 11 denotes the state of the processor status selected by the command instruction and takes on the binary value "0" or "1". The conditional execution status 709 in FIG. 11 similarly represents the state during the conditional execution of the subsequent instruction, with the command instruction. According to FIG. 11A, if for example the exclusive condition 701 is "1" and the conditional execution status 709 is "x'100", the processing of the EX state is overridden. FIG. 11B is a transition chart of the conditional execution status 709, controlled by the sequencer 716. The conditional execution status 709 is set from the initial value "x'000" to "x'101" when a command instruction is decoded, and when the next instruction is decoded, it is decremented sequentially by "x'1" and finally updated to "x'000".

The foregoing is a configuration example of a data processing device of the third embodiment. The following describes an example of the operation of a data processing device in accordance with the third embodiment. The machine language program in FIG. 12 is taken as an example to explain the operation when performing process execution. FIG. 12 lists a machine language program 2, which is notated mnemonically. The following is a simple explanation of its instructions.

Machine Language Program 2

First line: SUBIFEXZF R0, R1 (subtract the value of the register R1 from the value of the register R0 and store the result in the register R1. Furthermore, this instruction indicates that the subsequent four instructions are exclusive conditionally executed instructions with the zero flag of the processor status as the condition.)
Second line: MOV R2, R6 (store the value of the register R2 in the register R6)
Third line: MOV R3, R7 (store the value of the register R3 in the register R7)
Fourth line: MOV R4, R6 (store the value of the register R4 in the register R6)
Fifth line: MOV R5, R7 (store the value of the register R5 in the register R7)
Sixth line: MOV x '0001, R0 (store the immediate value x '0001 in the register R0)
Seventh line: ADD R0, R6 (add the value of the register R0 to the value of the register R6 and store the result in the register R6)
Eighth line: NOP (nothing is executed)

Thus, in this machine language program 2, the command instruction SUBIFEXZF of the first line is an exclusive conditional instruction effecting execution of only one of the subsequent instruction groups arranged at lines two to five. The state of the zero flag is determined by the result of the computational execution of the command instruction SUBIFEXZF, and depending on the state of the exclusive condition 701 indicated by the zero flag and the state of the conditional execution status 709, either the instruction group of the second and the third line or the instruction group of the fourth and the fifth line is executed exclusively, and the other instruction group is overridden.

FIG. 13 shows an operation timing chart of the processor 64. As shown in FIG. 13, the instruction overriding control circuit 708 is operated in accordance with the timing expressed by the first half (for example timing t11) and the second half (timing t12) of the stages. In particular in the DEC stage, the conditional execution status 709 is updated by the instruction overriding control circuit 708 at the second half of the timing. The following is an explanation, in temporal order, of the operations at each timing performed when executing the machine language program in FIG. 12. Here, it is assumed that "x'0001" has been stored in both the registers R0 and R1, "x'0002" has been stored in R2, "x'0003" has been stored in R3, "x'0004" has been stored in R4, and "x'0005" has been stored in R5.

Timing t1
IF stage: instruction 1 [SUBIFEXZF R0, R1]
Timing t11: Instruction 1 is read out from the ROM, and is stored in the instruction latch 714.

Timing t2
DEC stage: instruction 1 [SUBIFEXZF R0, R1]
Timing t21: Instruction 1, which has been stored in the instruction latch 714, is decoded by the instruction decoder 705. Register R0 is read out and "x'0001" is stored in the D1 latch 710. Register R1 is read out and "x'0001" is stored in the D2 latch 711.
Timing t22: The instruction overriding control circuit 708 sets the conditional execution status 709 from "x'000" to "x'101". The zero flag is selected by the selector 702 as the register expressing the value of the exclusive condition 701.
IF stage: instruction 2 [MOV R2, R6]
Timing t21: Instruction 2 is read from the ROM 717 and stored in the instruction latch 714.

Timing t3
EX stage: instruction 1 [SUBIFEXZF R0, R1]
Timing t31: The instruction overriding signal 707 stays in its initial state "0", the EX stage is executed, and the execution of instruction 1 begins. The values stored in the D1 latch 710 and the D2 latch 711 are subtracted by the arithmetic and logic unit 703. Here, the value "x'0001" is stored both in the D1 latch 710 and the D2 latch 711, so that "x'0000" is stored as the result of the subtraction in the register R1. As a result, "1" is stored in zero flag.
DEC stage: instruction 2 [MOV R2, R6]
Timing t31: The instruction 2 stored in the instruction latch 714 is decoded with the instruction decoder 705, register R2 is read out, and the value "x'0002" is stored in the D1 latch 710.
Timing t32: The instruction overriding control circuit 708 updates the conditional execution status 709 from "x'101" to "x'100". Because now the exclusive condition is "1" and because the conditional execution status is "x'100", the instruction overriding signal 707 stays "0", in accordance with FIG. 11A.
IF stage: instruction 3 [MOV R3, R7]
Timing t31: Instruction 3 is read from the ROM 717 and stored in the instruction latch 714.

Timing t4
EX stage: instruction 2 [MOV R2, R6]
Timing t41: Because the instruction overriding signal 707 is "0", the execution of instruction 2 begins. The value "x'0002" stored in the D1 latch 710 is read out, passed through the arithmetic and logic unit 703, and stored in the register R6. Thus, in this example, of the subsequent instructions, instruction 2 is executed.

DEC stage: instruction 3 [MOV R3, R7]

Timing t41: The instruction 3 stored in the instruction latch 714 is decoded with the instruction decoder 705, the register R3 is read out, and "x'0003" is stored in the D1 latch 710. Register R7 is read out and stored in the D2 latch 711.

Timing t42: The instruction overriding control circuit 708 updates the conditional execution status 709 from "x'100" to "x'011". Because now the exclusive condition is "1" and because the conditional execution status is "x'011", the instruction overriding signal 707 stays "0", in accordance with FIG. 11A.

IF stage: instruction 4 [MOV R4, R6]

Timing t41: Instruction 4 is read from the ROM 717 and stored in the instruction latch 714.

Timing t5

EX stage: instruction 3 [MOV R3, R7]

Timing t51: Because the instruction overriding signal 707 is "0", the execution of instruction 3 begins. The value "x'0003" stored in the D1 latch 710 is read out, passed through the arithmetic and logic unit 703, and stored in the register R7. Thus, in this example, of the subsequent instructions, instruction 3 is executed.

DEC stage: instruction 4 [MOV R4, R6]

Timing t51: The instruction 4 stored in the instruction latch 714 is decoded with the instruction decoder 705, the value "x'0004" is read out from the register R4 and stored in the D1 latch 710.

Timing t52: The instruction overriding control circuit 708 updates the conditional execution status 709 from "x'011" to "x'010". Here, because the conditional execution status is "x'010" and the exclusive condition is "1", the instruction overriding control circuit 708 generates an instruction overriding signal 707 and updates the instruction overriding signal 707 from "0" to "1", in accordance with FIG. 11A.

IF stage: instruction 5 [MOV R5, R7]

Timing t51: Instruction 5 is read from the ROM 717 and stored in the instruction latch 714.

Timing t6

EX stage: instruction 4 [MOV R4, R6]

Timing t61: Because the instruction overriding signal 707 is "1", the instruction 4 is overridden. Thus, in this example, of the subsequent instructions, instructions 2 and 3 are executed, but instruction 4 is overridden and not executed.

DEC stage: instruction 5 [MOV R5, R7]

Timing t61: The instruction 5 stored in the instruction latch 714 is decoded with the instruction decoder 705, the value "x'0005" is read out from the register R5 and stored in the D1 latch 710.

Timing t62: The instruction overriding control circuit 708 updates the conditional execution status 709 from "x'010" to "x'001". Here, because the conditional execution status is "x'001" and the exclusive condition is "1", the instruction overriding control circuit 708 generates an instruction overriding signal 707, and the instruction overriding signal 707 stays "1", in accordance with FIG. 11A.

IF stage: instruction 6 [MOV x'0001, R6]

Timing t61: Instruction 6 is read from the ROM and stored in the instruction latch 714.

Timing t7

EX stage: instruction 5 [MOV R5, R7]

Timing t71: Because the instruction overriding signal 707 is "1", the instruction 5 is overridden. Thus, in this example, of the subsequent instructions, the instructions 2 and 3 are executed, but the instructions 4 and 5 are overridden and not executed.

DEC stage: instruction 6 [MOV x'0001, R6]

Timing t71: The instruction 6 stored in the instruction latch 714 is decoded with the instruction decoder 705, and the immediate value "x'0001" is stored in the D1 latch 710.

Timing t72: The instruction overriding control circuit 708 updates the conditional execution status 709 from "x'001" to "x'000". Here, because the conditional execution status is "x'000" and the exclusive condition is "1", the instruction overriding control circuit 708 updates the instruction overriding signal 707 from "1" to "0", in accordance with FIG. 11A.

IF stage: instruction 7 [ADD R0, R6]

Timing t71: Instruction 7 is read from the ROM 717 and stored in the instruction latch 714.

Timing t8

EX stage: instruction 6 [MOV x'0001, R6]

Timing t81: Because the instruction overriding signal 707 is "0", the execution of the instruction 6 begins. The value stored in the D1 latch 710 is read out, passed through the arithmetic and logic unit 703, and stored in the register R6.

DEC stage: instruction 7 [ADD R0, R6]

Timing t81: The instruction 7 stored in the instruction latch 714 is decoded with the instruction decoder 705. The value "x'0001" is read out from the register R0 and stored in the D1 latch 710. The value "x'0001" is read out from the register R6 and stored in the D2 latch 711.

IF stage: instruction 8 [NOP]

Timing t81: Instruction 8 is read from the ROM 717 and stored in the instruction latch 714.

Thus, with this embodiment, the zero flag is selected as the exclusive condition by the instruction 1 [SUBIFEXZF R0, R1], and conditional execution is executed by setting the conditional execution status 709, so that it is not necessary to add a special condition specifying field to the instruction group 1 (instruction 2 and instruction 3) or the instruction group 2 (instruction 4 and instruction 5), which include a plurality of instructions, and only one of the instruction groups is executed, whereas the other instruction group is overridden and not executed.

Figures 11A, 11B:
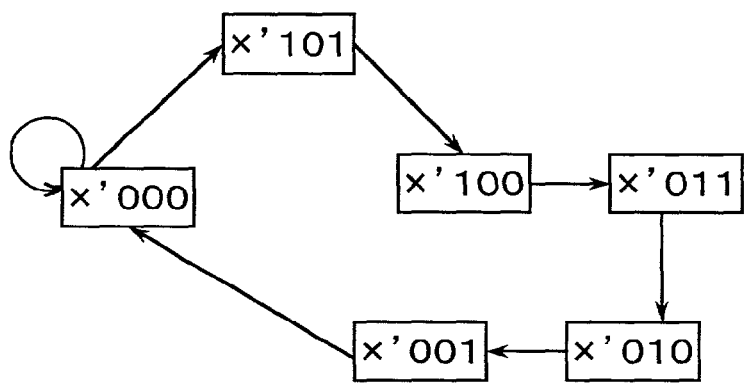
FIG. 11A shows the instruction overriding control process and FIG. 11B shows the conditional execution status transition chart for the third embodiment of the present invention.

It should be noted that in the foregoing explanations, the register R0 and the register R1 had the same values, so that the value of the zero flag became "1", but also if the register R0 and the register R1 do not have the same values and the value of the zero flag becomes "0", an instruction overriding control can be performed by letting the instruction overriding control circuit 708 control the instruction overriding signal 707 in accordance with FIG. 11A. In that case, of the subsequent instructions, the instructions 2 and 3 are overridden and not executed, whereas the instructions 4 and 5 are executed.

In the above-described example, the instruction 1 selects, from the processor status words 712, the zero flag as the instruction overriding signal 707, but there is no limitation to this, and it is also possible to select other processor status words 712.

Fourth Embodiment

As the fourth embodiment, examples of a first and a second program conversion device are explained. In the second embodiment, the subsequent instruction was one instruction, whereas in the fourth embodiment, the subsequent instructions are a subsequent instruction group made up of a plurality of instruction strings.

A program conversion device of the present invention is explained with reference to the FIGS. 6, 12, 14, 15 and 16.

Elements that already have been explained are denoted by like numerals, and their further explanation has been omitted.

The overall configuration of the data processing device of the fourth embodiment can be as in FIG. 6, and is as described in the second embodiment, so that further explanations have been omitted.

The following is an example of the operation of rewriting a program with the program conversion device of the fourth embodiment. In the following, two rewriting examples are discussed. Firstly, an example is discussed in which the not-yet-rewritten assembly language program in FIG. 14 is rewritten into the machine language program in FIG. 12. The machine language program in FIG. 12 is the same as the program used in the third embodiment. Secondly, an example is given in which the not-yet-rewritten assembly language program in FIG. 15 is rewritten into the machine language program in FIG. 12. The instructions in FIGS. 12, 14 and 15, given in mnemonic notation, already have been explained, and only the operands (immediate values and registers) such as used for the ADD instruction or the MOV instruction are different, so that further explanations have been omitted.

Figure 16:
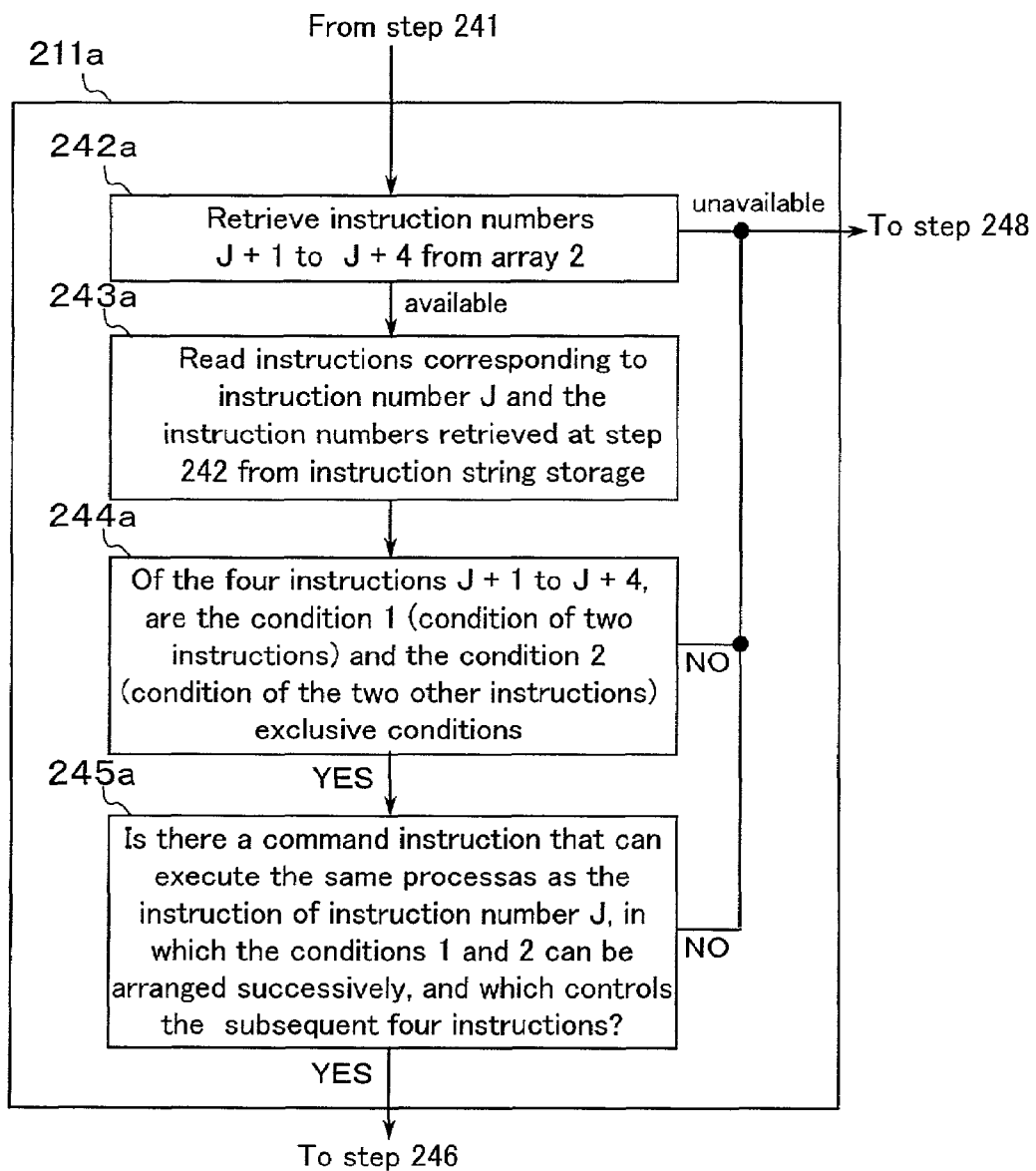
FIG. 16 is a flowchart showing the first half of the second process 207 performed by a program conversion device in accordance with a fourth embodiment of the present invention.

FIG. 16 is a flowchart showing the first half of the second process 207 performed by the program conversion device in accordance with this fourth embodiment. This second process 207 accomplishes an instruction rewriting portion for rewriting condition/decision instructions detected by the first process 206 into instruction strings of a computational instruction and one or a plurality of subsequent instruction groups that follow this computational instruction and are associated with this computational instruction. This second process 207 is carried out by the first judgment portion 208, the second judgment portion 209, the instruction retrieval portion 210, and the instruction rewriting portion 205. It should be noted that numeral 211a in FIG. 16 denotes a portion corresponding to numeral 211 in FIG. 10, whereas other elements are as in FIG. 10 and are therefore not explained any further.

In Step 242a, the first judgment portion 208 retrieves the instruction numbers J+1, J+2, J+3 and J+4 from the array 2. That is to say, Step 242a is a process that accomplishes the first judgment portion, which judges, whether a first conditional instruction and a second conditional instruction that have been detected by the second instruction detection portion 203 follow successively after the instruction detected by the first instruction detection portion 202.

Step 243a reads out and stores instructions corresponding to the instruction numbers (here, instruction A, instruction B, instruction C, instruction D, and instruction E).

In Step 244a, the second judgment portion 209 judges whether a condition 1 of the instruction B and the instruction C and a condition 2 of the instruction D and the instruction E are exclusive conditions. That is to say, this process accomplishes the second judgment portion, which judges whether the execution conditions of the first conditional instruction and the second conditional instruction contradict one another.

In Step 245a, the instruction retrieval portion 210 judges whether there is a command instruction that can execute the same process as instruction A, in which the conditions 1 and 2 can be arranged successively, and which controls the subsequent four instructions. That is to say, this Step 245a accomplishes the command instruction retrieval portion, which retrieves from the machine language instruction code a command instruction that indicates the same process execution as the instruction detected by the first instruction detection portion 202, and that indicates that the subsequent first conditional instruction and second conditional instruction are executed at conditions that are contradictory.

The following is a description of the processing of 211a in the fourth embodiment.

First, the procedure by which the not-yet-rewritten assembly language program in FIG. 14 is rewritten into the machine language program of FIG. 12 is described, in the order of the first process 206 and the second process 207. It should be noted that the instruction of the first line is denoted as instruction (1), the instruction of the second line is denoted as instruction (2) etc., that is, with the line number in parentheses.

First Process 206

The first process 206 is carried out similarly as in the second embodiment, and finally, 1 and 7 are stored in the array 1, whereas 2, 3, 4 and 5 are stored in the array 2. These numbers are later used by the second process 207.

Second Process 207

Step 240: The process begins from the element in the first line of the array 1.

Step 241: The 1, which is the instruction number of the first line, is read out from the array 1 and stored in the variable J.

Step 242a: The first judgment portion 208 retrieves the instruction numbers J+1, J+2, J+3 and J+4 from the array 2. Because J=1, and because instruction numbers are given for all instructions (2), (3), (4) and (5), the procedure advances to Step 243.

Step 243a: The instructions corresponding to the variables J to J+4 are read from the instruction string storage, and stored as instruction A (SUB), instruction B (MOVIFZF), instruction C (MOVIFZF), instruction D (MOVIFNZF) and instruction E (MOVIFNZF), respectively.

Step 244a: The second judgment portion 209 judges whether, of the four instructions, the condition of two instructions are a conditions 1, the condition of the two other instructions are a conditions 2, and whether the condition 1 and the condition 2 are exclusive conditions. Here, it is detected that when the state of the zero flag is "1", the instructions B and C are executed, whereas when the state of the zero flag is "0", the instructions D and E are executed, so that it is determined that the conditions 1 and 2 are exclusive conditions, executed at contradictory states of the zero flag. Moreover, the condition 1 is stored as "exclusive condition is 1" whereas the condition 2 is stored as "exclusive condition is 0".

Step 245a: The instruction retrieval portion 210 judges whether there is a command instruction that can execute the same process as instruction A, in which the conditions 1 and 2 can be arranged successively, and which controls the subsequent four instructions. Here, SUBEXIFZF is a candidate, so that the procedure advances to Step 246.

Step 246: The instruction rewriting portion 205 rewrites the instruction A into SUBEXIFZF. Furthermore, it rewrites the processes corresponding to the instructions B, C, D and E into instructions that are executed unconditionally. Then, the procedure advances to Step 247.

Step 247: The instruction rewriting portion 205 rewrites the instructions corresponding to the variables J to J+4 in the instruction string storage into the instruction A (SUBIFEXZF), the instruction B (MOV), the instruction C (MOV), the instruction D (MOV), and the instruction E (MOV), respectively.

Step 248: It is determined whether all instruction numbers of the array 1 have been processed. There are still instruction numbers left, so that the procedure advances to Step 249.

Step 249: The pointer to the array 1 is incremented by 1, so as to process the next instruction number in the array 1.

Step 241: The 7, which is the instruction number of the second line, is read out from the array 1 and stored in the variable J.

Step 242: The first instruction detection portion 202 retrieves the instruction numbers of the variables J+1 to J+4 from the array 2. Since J=7, it is now determined whether the instruction numbers for the instructions (8) to (11) are given. Here, they are not given, so that the procedure advances to Step 248.

Step 248: It is determined whether all instruction numbers of the array 1 have been processed. There are no more instruction numbers in the array 1, so that the procedure advances to Step 250.

Step 250: The second process 207 is terminated.

Thus, with this fourth embodiment, the instructions (1) to (5) of FIG. 14, which shows the not-yet-rewritten program as stored in the instruction string storage 201, are rewritten into the instructions (1) to (5) of FIG. 12. The program conversion device of the fourth embodiment judges at Step 244a whether two conditions are exclusive, and judges at Step 245a whether it is possible to rewrite the instruction preceding the four instructions into a command instruction that causes an exclusive conditional execution of the subsequent four instructions. Thus, the program conversion device 62 can rewrite the instruction strings that are eventually stored in the command string storage 201 into instruction strings including command instructions effecting that a subsequent instruction 1 and an instruction 2 that follows instruction 1 are executed at contradictory conditions.

It should be noted that although an assembly language program was entered into the program conversion device of the fourth embodiment, it is also possible to devise the program conversion device such that a machine language program is input to generate a new machine language program.

The following is an explanation of the procedure by which the not-yet-rewritten assembly language program in FIG. 15 is rewritten into the machine language program in FIG. 12. In FIG. 15, the conditionally executed instructions are arranged at the second, third, fourth and fifth line. The condition 1 of the second and fifth line and the condition 2 of the third and fourth line are mutually exclusive conditions.

The following explanations are in the order of the first process 206 and the second process 207. It should be noted that the instruction of the first line is denoted as instruction (1), the instruction of the second line is denoted as instruction (2) etc., that is, with the line number in parentheses.

First Process 206

The first process 206 is carried out similarly as in the second embodiment, and finally, 1 and 7 are stored in the array 1, whereas 2, 3, 4 and 5 are stored in the array 2. These numbers are used later by the second process 207.

Second Process 207

Step 240: The process begins from the element in the first line of the array 1.

Step 241: The 1, which is the instruction number of the first line, is read out from the array 1 and stored in the variable J.

Step 242a: The first judgment portion 208 retrieves the instruction numbers J+1, J+2, J+3 and J+4 from the array 2.

Because J=1, and because instruction numbers are given for all instructions (2), (3), (4) and (5), the procedure advances to Step 243a.

Step 243a: The instructions corresponding to the variables J to J+4 are read from the instruction string storage, and stored as instruction A (SUB), instruction B (MOVIFNZF), instruction C (MOVIFZF), instruction D (MOVIFZF) and instruction E (MOVIFNZF), respectively.

Step 244a: The second judgment portion 209 judges whether, of the four instructions, the condition of two instructions are a condition 1, the condition of the two other instructions are a condition 2, and whether the condition 1 and the condition 2 are exclusive conditions. Here, it is detected that when the state of the zero flag is "1", the instructions C and D are executed, whereas when the state of the zero flag is "0", the instructions B and E are executed, so that it is determined that the conditions 1 and 2 are exclusive conditions, executed at contradictory states of the zero flag. Moreover, the condition 1 is stored as "exclusive condition is 1", whereas the condition 2 is stored as "exclusive condition is 0".

Step 245a: The instruction retrieval portion 210 judges whether there is a command instruction that can execute the same process as instruction A, in which the conditions 1 and 2 can be arranged successively, and which controls the subsequent four instructions. Here, SUBEXIFZF is a candidate, so that the procedure advances to Step 246.

Step 246: The instruction rewriting portion 205 rewrites the instruction A into SUBEXIFZF. Furthermore, it rewrites the processes corresponding to the instructions B, C, D and E into instructions that are executed unconditionally. It also rearranges the instructions such that the instructions corresponding to the condition 1 are executed first. Here, instruction C is arranged at the position of instruction B, instruction D is arranged at the position of instruction C, and instruction B is arranged at the position of instruction D.

Step 247: The instruction rewriting portion 205 rewrites the instructions corresponding to the variables J to J+4 in the instruction string storage into the instruction A (SUBIFEXZF), the instruction B (MOV), the instruction C (MOV), the instruction D (MOV), and the instruction E (MOV), respectively.

Step 248: It is determined whether all instruction numbers of the array 1 have been processed. There are still instruction numbers left, so that the procedure advances to Step 249.

Step 249: The pointer to the array 1 is increased incrementally by 1, so as to process the next instruction number in the array 1.

Step 241: The 7, which is the instruction number of the second line, is read out from the array 1 and stored in the variable J.

Step 242: The first instruction detection portion 202 retrieves the instruction numbers of the variables J+1 to J+4 from the array 2. Since J=7, it is now determined whether the instruction numbers for the instructions (8) to (11) are given. Here, they are not given, so that the procedure advances to Step 248.

Step 248: It is determined whether all instruction numbers of the array 1 have been processed. There are no more instruction numbers in the array 1, so that the procedure advances to Step 250.

Step 250: The second process 207 is terminated.

Thus, with this fourth embodiment, the instructions (1) to (5) of FIG. 15, which shows the not-yet-rewritten program as stored in the instruction string storage 201, are rewritten into the instructions (1) to (5) of FIG. 12. Here, in Step 246 as shown above, first the instructions corresponding to the condition 1 (instructions C and D) are rearranged directly behind instruction number J without changing their relative positions. Then, the instructions corresponding to the condition 2 (instructions B and E) are rearranged directly after that without changing their relative positions. Here, the execution order of the instructions corresponding to the condition 1 is not modified. Also the execution order of the instructions corresponding to the condition 2 is not modified. Thus, the program conversion device 62 can rearrange instruction strings containing conditions for execution with a command instruction such that the realized process is not affected, and rewrite the instruction strings that are eventually stored in the command string storage 201 into instruction strings including command instructions effecting that a subsequent instruction 1 and an instruction 2 that follows instruction 1 are executed at contradictory conditions.

Fifth Embodiment

As the fifth embodiment, examples of a third and a fourth data processing device of the present invention are shown. In the fifth embodiment, an instruction for which no condition for execution has been indicated is executed conditionally by updating the conditional execution status 709.

The following describes a data processing device in accordance with the fifth embodiment of the present invention with reference to the FIGS. 1, 2, 17, 18, and 19. It should be noted that portions that are the same as in the first embodiment are denoted by like numerals, and their further explanation has been omitted.

The overall configuration of the data processing device of the fifth embodiment can be as in FIG. 1, and the configuration of the processor can be as in FIG. 2. The configuration of the data processing device and the processor can be as described in the first embodiment, so that further explanations have been omitted.

The instruction overriding control process and the transition of the conditional execution status 709 in accordance with the fifth embodiment are described with reference to FIG. 17. FIG. 17A lists whether the instruction overriding control circuit 708 overrides the processing of the EX stage in accordance with the exclusive condition and the conditional execution status (instruction overriding signal 707). The exclusive condition 701 in FIG. 17 denotes the state of the processor status selected by the command instruction and takes on the binary value "0" or "1". The conditional execution status 709 in FIG. 17 similarly represents the state during the conditional execution of the subsequent instruction, with the command instruction. According to FIG. 17A, if for example the exclusive condition 701 is "1" and the conditional execution status 709 is "x'01", the processing of the EX state is overridden. FIG. 17B is a transition chart of the conditional execution status 709, controlled by the sequencer 716. The conditional execution status 709 is set from the initial value "x'00" to "x'10" when a command instruction is decoded, and when the next instruction is decoded, it is decremented sequentially by "x'1" and finally updated to "x'00".

The foregoing is a configuration example of a data processing device of the fifth embodiment. The following describes an example of the operation of a data processing device in accordance with the fifth embodiment. The machine language program 3 in FIG. 18 is taken as an example to explain the operation when performing process execution. FIG. 18 lists the machine language program 3, which is notated mnemonically. The following is a simple explanation of its instructions.

Machine Language Program 3

First line: SUBIFXZF R0, R1 (subtract the value of the register R1 from the value of the register R0 and store the result in the register R1. Furthermore, this instruction indicates that the subsequent instructions are conditionally executed instructions that are executed when the zero flag of the processor status is 0).
Second line: MOV R2, R3 (store the value of the register R2 in the register R3)
Third line: ADD R3, R6 (add the value of the register R3 to the value of the register R6 and store the result in the register R6)
Fourth line: MOV R4, R7 (store the value of the register R4 in the register R7)

Thus, in this machine language program 3, the command instruction SUBIFEXZF of the first line indicates a conditional instruction effecting that the subsequent instruction at line two is executed depending on the state of the zero flag. As will be explained below, the state of the zero flag is determined by the result of the computational execution of the command instruction SUBIFXZF, and depending on the state of the exclusive condition 701 indicated by the zero flag and the conditional execution status 709, it is decided whether the subsequent instruction at the second line is overridden.

FIG. 19 shows an operation timing chart of the processor 64. As shown in FIG. 19, the instruction overriding control circuit 708 is operated in accordance with the timing expressed by the first half (for example timing t11) and the second half (timing t12) of the stages. In particular in the DEC stage, the conditional execution status 709 is updated by the instruction overriding control circuit 708 at the second half of the timing. The following is an explanation, in temporal order, of the operations at each timing performed when executing FIG. 19. Here, it is assumed that "x'0001" has been stored in both the registers R0 and R1, "x'0002" has been stored in R2, "x'0003" has been stored in R3, and "x'0004" has been stored in R4.

Timing t1
 IF stage: instruction 1 [SUBIFXZF R0, R1]
 Timing t11: Instruction 1 is read out from the ROM 717, and is stored in the instruction latch 714.

Timing t2
 DEC stage: instruction 1 [SUBIFXZF R0, R1]
 Timing t21: Instruction 1, which has been stored in the instruction latch 714, is decoded by the instruction decoder 705. Register R0 is read out and "x'0001" is stored in the D1 latch 710. Register R1 is read out and "x'0001" is stored in the D2 latch 711.
 Timing t22: The instruction overriding control circuit 708 sets the conditional execution status 709 from "x'00" to "x'10". The zero flag is selected by the selector 702 as the register expressing the value of the exclusive condition 701.
 IF stage: instruction 2 [MOV R2, R3]
 Timing t21: Instruction 2 is read from the ROM 717 and stored in the instruction latch 714.

Timing t3
 EX stage: instruction 1 [SUBIFXZF R0, R1]
 Timing t31: The instruction overriding signal 707 stays in its initial state "0", the EX stage is executed, and the execution of instruction 1 begins. The values stored in the D1 latch 710 and the D2 latch 711 are subtracted by the arithmetic and logic unit 703. Here, the value "x'0001" is stored in both the D1 latch 710 and the D2 latch 711, so that "x'0000" is stored as the result of the subtraction in the register R1. As a result, "1" is stored in the zero flag.

DEC stage: instruction 2 [MOV R2, R3]

Timing t31: The instruction 2 stored in the instruction latch 714 is decoded with the instruction decoder 705, register R2 is read out, and the value "x'0002" is stored in the D1 latch 710.

Timing t32: The instruction overriding control circuit 708 updates the conditional execution status 709 from "x'10" to "x'01". Because now the exclusive condition is "1", and because the conditional execution status is "x'01", in accordance with FIG. 17A, an instruction overriding signal 707 is generated and updated from "0" to "1".

IF stage: instruction 3 [ADD R3, R6]

Timing t31: Instruction 3 is read from the ROM 717 and stored in the instruction latch 714.

Timing t4

EX stage: instruction 2 [MOV R2, R3]

Timing t41: Because the instruction overriding signal 707 is "1", the instruction 2 is overridden and not executed. Thus, in this example, the subsequent instruction 2 is overridden.

DEC stage: instruction 3 [ADD R3, R6]

Timing t41: The instruction 3 stored in the instruction latch 714 is decoded with the instruction decoder 705, and the register R3 is read out and stored in the D1 latch 710. Register R6 is read out and stored in the D2 latch 711.

Timing t42: The instruction overriding control circuit 708 updates the conditional execution status 709 from "x'01" to "x'00". Because now the exclusive condition is "1", and because the conditional execution status is "x'00", the instruction overriding signal 707 becomes "0", in accordance with FIG. 17A.

IF stage: instruction 4 [MOV R4, R7]

Timing t41: Instruction 4 is read from the ROM 717 and stored in the instruction latch 714.

Timing t5

EX stage: instruction 3 [ADD R3, R6]

Timing t51: Because the instruction overriding signal 707 is "0", the execution of instruction 3 begins. The value stored in the D1 latch 710 is added by the arithmetic and logic unit 703 to the value stored in the D2 latch 711, and stored in the register R6. Thus, in this example, the subsequent instruction (2) is overridden, but the instruction (3) following the instruction (2) is executed.

DEC stage: instruction 4 [MOV R4, R7]

Timing t51: The instruction 4 stored in the instruction latch 714 is decoded with the instruction decoder 705, the register R4 is read out and its value is stored in the D1 latch 710.

Timing t52: The instruction overriding control circuit 708 holds the conditional execution status 709 with "x'00".

IF stage: instruction 5 [NOP]

Timing t51: Instruction 5 is read from the ROM 717 and stored in the instruction latch 714.

Thus, with this embodiment, the zero flag is selected as the condition by the instruction 1 [SUBIFXZF R0, R1], and conditional execution is performed by setting the conditional execution status 709, so that the execution or overriding of subsequent instructions can be specified without having to add a special condition specifying field to the subsequent instructions.

Figures 17A, 17B:
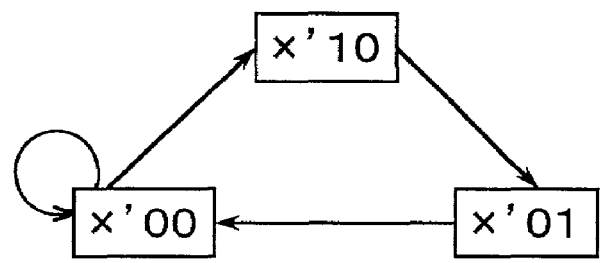
FIG. 17A shows the instruction overriding control process and FIG. 17B shows the conditional execution status transition chart for the fifth embodiment of the present invention.

It should be noted that in the foregoing explanations, the register R0 and the register R1 had the same values, so that the value of the zero flag became "1", but also if the register R0 and the register R1 do not have the same values and the value of the zero flag becomes "0", an instruction overriding control can be performed by letting the instruction overriding control circuit 708 control the instruction overriding signal 707 in accordance with FIG. 17A. In that case, the subsequent instruction (2) is overridden and not executed.

Sixth Embodiment

As the sixth embodiment, examples of a third and a fourth program conversion device of the present invention are explained. A program conversion device of the sixth embodiment is explained with reference to the FIGS. 18, 20, 21 and 22. Elements that already have been explained are denoted by like numerals, and their further explanation has been omitted.

Figure 20:
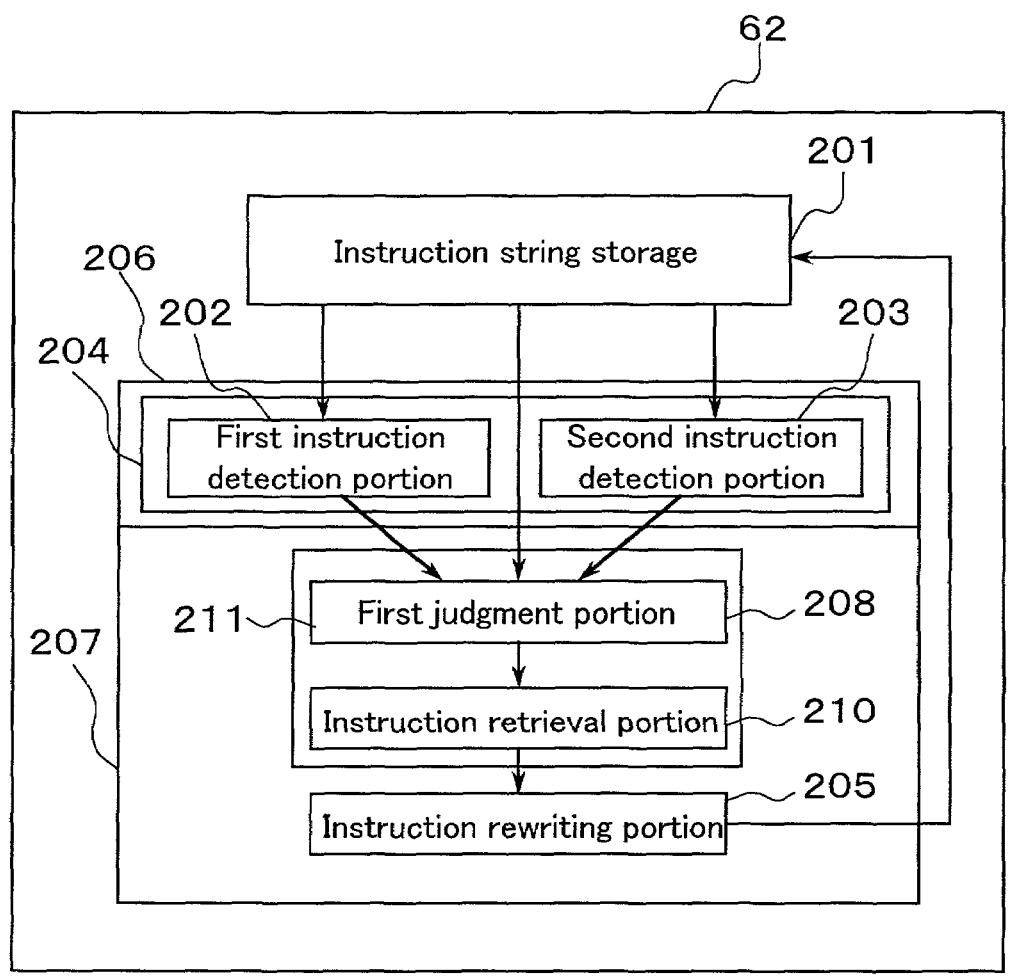
FIG. 20 is a diagram schematically showing the configuration of a program conversion device in accordance with the sixth embodiment of present invention.

The overall configuration of the program conversion device of the sixth embodiment is shown in FIG. 20. As shown in FIG. 20, the program conversion device of the sixth embodiment does not include a second judgment portion, in contrast to FIG. 6 of the second embodiment. Other components are the same, so that further explanations have been omitted.

The following is an example of the operation of rewriting a program with the program conversion device of the sixth embodiment. In this example, the not-yet-rewritten assembly language program in FIG. 21 is rewritten into the machine language program in FIG. 18. The machine language program in FIG. 18 is the same as the program used in the fifth embodiment. The instructions in FIGS. 18 and 21, given in mnemonic notation, are as in the above-explained program, and only the operands (immediate values and registers), such as used for the ADD instruction or the MOV instruction, are different, so that further explanations have been omitted.

Figure 22:
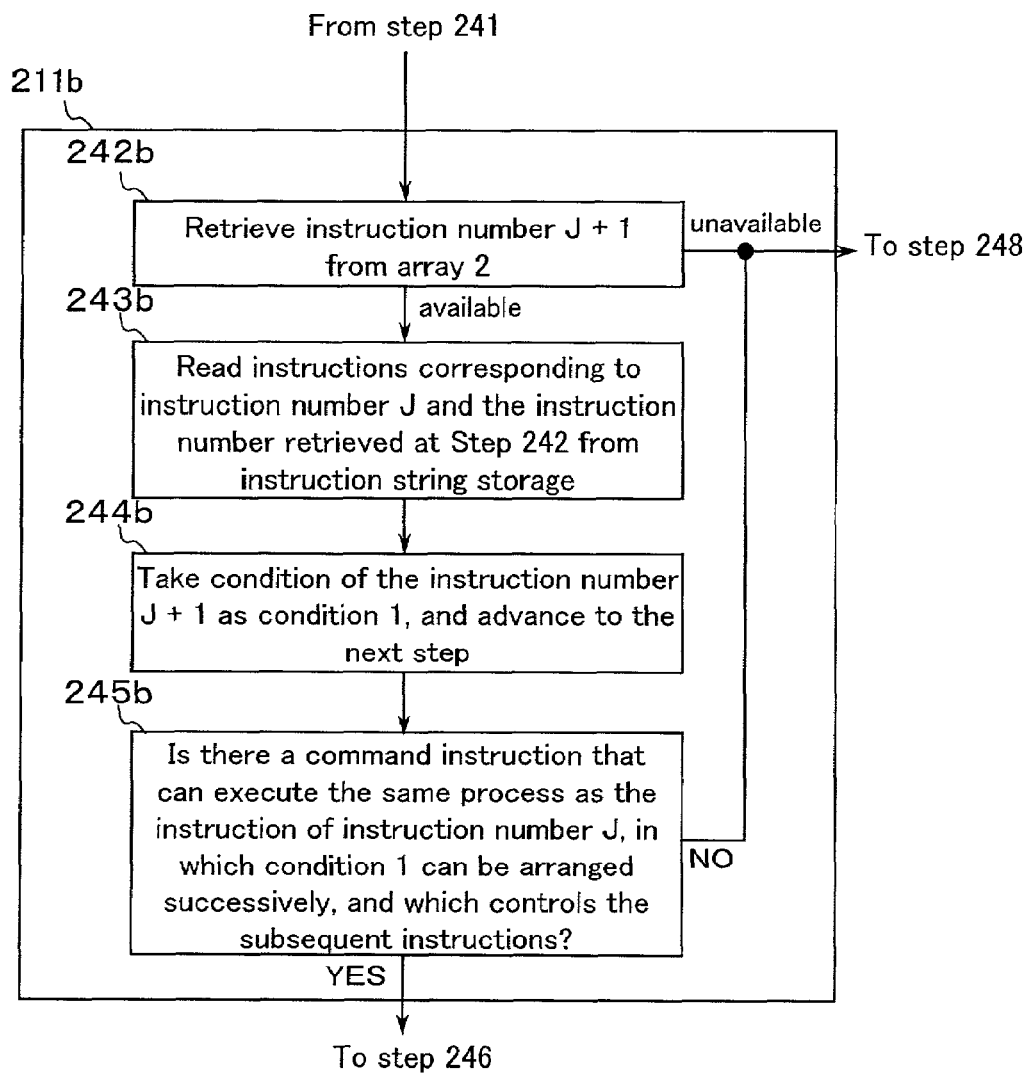
FIG. 22 is a flowchart showing the first half of the second process 207 performed by a program conversion device in accordance with the sixth embodiment of the present invention.

FIG. 22 is a flowchart showing the first half of the second process 207 performed by the program conversion device in accordance with the sixth embodiment. This second process 207 accomplishes an instruction rewriting portion for rewriting condition/decision instructions detected by the first process 206 into instruction strings of a computational instruction and one or a plurality of subsequent instructions that follow this computational instruction and are associated with this computational instruction. This second process 207 is realized by the first judgment portion 208, the instruction retrieval portion 210, and the instruction rewriting portion 205.

It should be noted that numeral 211*b* in FIG. 22 denotes a portion corresponding to numeral 211 in FIG. 10, whereas other elements are as in FIG. 10 and therefore are not explained any further.

In Step 242*b*, the first judgment portion 208 retrieves the instruction number J+1 from the array 2. That is to say, Step 242*b* executes the first judgment portion, which judges, after the instruction detected by the first instruction detection portion, whether there is an instruction detected by the second instruction detection portion.

Step 243*b* reads out and stores instructions corresponding to the instruction numbers (here, instruction A and instruction B).

Step 244*b* stores the condition of instruction B as a condition 1.

In Step 245*b*, the instruction retrieval portion 210 judges whether there is a command instruction that can execute the same process as instruction A, in which condition 1 can be arranged successively, and which controls the subsequent instructions. That is to say, this Step 245*b* accomplishes the command instruction retrieval portion, which retrieves from the machine language instruction code a command instruction that indicates the same process execution as the instruction detected by the first instruction detection portion, and that indicates the execution condition for the subsequent conditional instruction.

The following is a description of the processing of 211b in the sixth embodiment.

The following describes the procedure by which the not-yet-rewritten assembly language program in FIG. 21 is rewritten into the machine language program in FIG. 18, in the order of the first process 206 and the second process 207. It should be noted that the instruction of the first line is denoted as instruction (1), the instruction of the second line is denoted as instruction (2) etc., that is, with the line number in parentheses.

First Process 206

The first process 206 is carried out similarly as in the second embodiment, and finally, 1 and 3 are stored in the array 1, whereas 2 is stored in the array 2. These numbers later are used by the second process 207.

Second Process 207

Step 240: The process begins from the element in the first line of the array 1.

Step 241: The 1, which is the instruction number of the first line, is read out from the array 1 and stored in the variable J.

Step 242b: The first judgment portion 208 retrieves the instruction number J+1 from the array 2. Because now J=1 and because instruction (2) exists, the procedure advances to Step 243b.

Step 243b: The instructions corresponding to variables J and J+1 are read from the instruction string storage, and stored as instruction A (SUB) and instruction B (MOV-IFNZF), respectively.

Step 244b: The condition of the instruction B is taken as the condition 1, and the procedure advances to the next step.

Step 245b: The instruction retrieval portion 210 judges whether there is a command instruction that can execute the same process as instruction A, in which the condition 1 can be arranged successively, and which controls the subsequent instructions. Here, SUBIFXZF is a candidate, so that the procedure advances to Step 246.

Step 246: The instruction rewriting portion 205 rewrites the instruction A into SUBIFXZF. Furthermore, it rewrites the process corresponding to the instruction B with an instruction that is executed unconditionally. Then, the procedure advances to Step 247.

Step 247: The instruction rewriting portion 205 rewrites the instructions corresponding to the variable J and the variable J+1 in the instruction string storage into the instruction A (SUBIFXZF) and the instruction B (MOV), respectively.

Step 248: It is determined whether all instruction numbers of the array 1 have been processed. There are still instruction numbers left, so that the procedure advances to Step 249.

Step 249: The pointer to the array 1 is increased incrementally by 1, so as to process the next instruction number in the array 1.

Step 241: 3, which is the instruction number of the second line, is read out from the array 1 and stored in the variable J.

Step 242: The first instruction detection portion 202 retrieves the instruction number of the variable J+1 from the array 2. Because now J=3, it is determined whether there is an instruction (4) in the array 2. Here, there is no instruction (4), so that the procedure advances to Step 248.

Step 248: It is determined whether all instruction numbers of the array 1 have been processed. There are no more instruction numbers in the array 1, so that the procedure advances to Step 250.

Step 250: The second process 207 is terminated.

Thus, with this sixth embodiment, the instructions (1) and (2) of FIG. 21 as stored in the instruction string storage 201 are rewritten into the instructions (1) and (2) of FIG. 18. Thus, the program conversion device 62 can rewrite instruction strings stored finally in the instruction string storage 201 into instruction strings including command instructions for which a condition for execution is indicated and instructions for which no condition for execution is indicated.

It should be noted that although an assembly language program was input into the program conversion device of the sixth embodiment, it is also possible to devise the program conversion device such that a machine language program is input to generate a new machine language program.

Seventh Embodiment

As the seventh embodiment, examples of a third and a fourth data processing device of the present invention are shown. In this seventh embodiment, a plurality of instructions for which no condition for execution has been indicated are conditionally executed by updating the conditional execution status 709. In the data processing device of the fifth embodiment, there was only one instruction, whereas in this seventh embodiment, the subsequent instructions are a subsequent instruction group including a plurality of instruction strings.

The following describes a data processing device in accordance with the seventh embodiment of the present invention with reference to the FIGS. 1, 2, 23, 24, and 25. It should be noted that portions that are the same as in the first embodiment etc. are denoted by like numerals, and their further explanation has been omitted.

The overall configuration of the data processing device of the seventh embodiment can be as in FIG. 1, and the configuration of the processor can be as in FIG. 2. The configuration of the data processing device and the processor can be as described in the first embodiment, so that further explanations have been omitted.

The instruction overriding control process and the transition of the conditional execution status 709 in accordance with the seventh embodiment are described with reference to FIG. 23. FIG. 23A lists whether the instruction overriding control circuit 708 overrides the processing of the EX stage (instruction overriding signal 707). The exclusive condition 701 in FIG. 23A denotes the state of the processor status selected by the command instruction of this embodiment and takes on the binary value "0" or "1". The conditional execution status 709 in FIG. 23 similarly represents the state during the conditional execution of the subsequent instruction, with the command instruction of the present embodiment. According to FIG. 23A, if for example the exclusive condition 701 is "1" and the conditional execution status 709 is "x'01" or "x'10", the processing of the EX state is overridden. FIG. 23B is a transition chart of the conditional execution status 709, controlled by the sequencer 716. The conditional execution status 709 is set from the initial value "x'00" to "x'11" when a command instruction is decoded, and when the next instruction is decoded, it is decremented sequentially by "x'1" and finally updated to "x'00".

The foregoing is a configuration example of a data processing device of the seventh embodiment. The following describes an example of the operation of a data processing device in accordance with the seventh embodiment. The machine language program 4 in FIG. 24 is taken as an example to explain the operation when performing process execution. FIG. 24 lists the machine language program 4 in mnemonic notation. The following is a simple explanation of its instructions.

Machine Language Program 4

First line: SUBIFNXZF R0, R1 (subtract the value of the register R1 from the value of the register R0 and store the result in the register R1. Furthermore, this instruction indicates that the subsequent two instructions as conditionally executed instructions that are executed when the zero flag of the processor status is 0.)
Second line: MOV R2, R3 (store the value of the register R2 in the register R3)
Third line: MOV R5, R4 (store the value of the register R5 in the register R4)
Fourth line: ADD R3, R6 (add the value of the register R3 to the value of the register R6 and store the result in the register R6)
Fifth line: MOV R4, R7 (store the value of the register R4 in the register R7)

Thus, in this machine language program 4, the command instruction SUBIFNXZF of the first line is a conditional instruction that decides whether the subsequent instruction group arranged at the second and the third line is executed or not. The state of the zero flag is determined by the result of the computational execution of the command instruction SUBIFNXZF, and depending on the state of this zero flag, it is decided whether the subsequent instruction group is executed.

FIG. 25 shows an operation timing chart of the processor 64. As shown in FIG. 25, the instruction overriding control circuit 708 is operated in accordance with the timing expressed by the first half (for example timing t11) and the second half (timing t12) of the stages. In particular in the DEC stage, the conditional execution status 709 is updated by the instruction overriding control circuit 708 at the second half of the timing. The following is an explanation, in temporal order, of the operations at each timing performed when executing the machine language program in FIG. 24. Here, it is assumed that "x'0001" has been stored in both the registers R0 and R1, "x'0002" has been stored in R2, "x'0003" has been stored in R3, "x'0004" has been stored in R4, "x'0005" has been stored in R5.

Timing t1

IF stage: instruction 1 [SUBIFNXZF R0, R1]

Timing t11: Instruction 1 is read out from the ROM 717, and is stored in the instruction latch 714.

Timing t2

DEC stage: instruction 1 [SUBIFNXZF R0, R1]

Timing t21: Instruction 1, which has been stored in the instruction latch 714, is decoded by the instruction decoder 705. Register R0 is read out and "x'0001" is stored in the D1 latch 710. Register R1 is read out and "x'0001" is stored in the D2 latch 711.

Timing t22: The instruction overriding control circuit 708 sets the conditional execution status 709 from "x'00" to "x'11". The zero flag is selected by the selector 702 as the register expressing the value of the exclusive condition 701.

IF stage: instruction 2 [MOV R2, R3]

Timing t21: Instruction 2 is read from the ROM 717 and stored in the instruction latch 714.

Timing t3

EX stage: instruction 1 [SUBIFNXZF R0, R1]

Timing t31: The instruction overriding signal 707 stays in its initial state "0", the EX stage is executed, and the execution of instruction 1 begins. The values stored in the D1 latch 710 and the D2 latch 711 are subtracted by the arithmetic and logic unit 703. Here, the value "x'0001" is stored in both the D1 latch 710 and the D2 latch 711, so that "x'0000" is stored as the result of the subtraction in the register R1. As a result, "1" is stored in zero flag.

DEC stage: instruction 2 [MOV R2, R3]

Timing t31: The instruction 2 stored in the instruction latch 714 is decoded with the instruction decoder 705, register R2 is read out, and the value "x'0002" is stored in the D1 latch 710.

Timing t32: The instruction overriding control circuit 708 updates the conditional execution status 709 from "x'11" to "x'10". Because now the exclusive condition is "1", and because the conditional execution status is "x'10", in accordance with FIG. 23A, an instruction overriding signal 707 is generated and updated from "0" to "1".

IF stage: instruction 3 [MOV R5, R4]

Timing t31: Instruction 3 is read from the ROM 717 and stored in the instruction latch 714.

Timing t4

EX stage: instruction 2 [MOV R2, R3]

Timing t41: Because the instruction overriding signal 707 is "1", the instruction 2 is overridden and not executed. Thus, of the subsequent instructions, instruction 2 is overridden, in this example.

DEC stage: instruction 3 [MOV R5, R4]

Timing t41: The instruction 3 stored in the instruction latch 714 is decoded with the instruction decoder 705, register R5 is read out and "x'0005" is stored in the D1 latch 710.

Timing t42: The instruction overriding control circuit 708 updates the conditional execution status 709 from "x'10" to "x'01". Because now the exclusive condition is "1", and because the conditional execution status is "x'01", in accordance with FIG. 23A, an instruction overriding signal 707 is generated and sustained at "1".

IF stage: instruction 4 [ADD R3, R6]

Timing t41: Instruction 4 is read from the ROM 717 and stored in the instruction latch 714.

Timing t5

EX stage: instruction 3 [MOV R5, R4]

Timing t51: Because the instruction overriding signal 707 is "1", instruction 3 is overridden. Thus, of the subsequent instructions, instructions 2 and 3 are overridden in this example.

DEC stage: instruction 4 [ADD R3, R6]

Timing t51: The instruction 4 stored in the instruction latch 714 is decoded with the instruction decoder 705, the register R3 is read out and its value is stored in the D1 latch 710. The register R6 is read out and its value is stored in the D2 latch 711.

Timing t52: The instruction overriding control circuit 708 updates the conditional execution status 709 from "x'01" to "x'00". Because now the exclusive condition is "1", and because the conditional execution status is "x'00", in accordance with FIG. 23A, no instruction overriding signal 707 is generated and the instruction overriding signal 707 is updated from "1" to "0".

IF stage: instruction 5 [MOV R4, R7]

Timing t51: Instruction 5 is read from the ROM 717 and stored in the instruction latch 714.

Timing t6

EX stage: instruction 4 [ADD R3, R6]

Timing t61: Because the instruction overriding signal 707 is "0", instruction 4 is executed. The value stored in the D1 latch 710 and the value stored in the D2 latch 711 are added by the arithmetic and logic unit 703 and stored in the register R6.

DEC stage: instruction 5 [MOV R4, R7]

Timing t61: The instruction 5 stored in the instruction latch 714 is decoded with the instruction decoder 705, the register R4 is read out and its value is stored in the D1 latch 710.

Timing t62: The instruction overriding control circuit 708 holds the conditional execution status 709 at "x'00".

IF stage: instruction 6 [NOP]

Timing t61: Instruction 6 is read from the ROM 717 and stored in the instruction latch 714. Thus, with this embodiment, the zero flag is selected as the condition by the instruction 1 [SUBIFNXZF R0, R1], and conditional execution is performed by setting the conditional execution status 709, so that the execution or overriding of a subsequent instruction group can be specified without having to add a special condition specifying field to the subsequent instruction group.

Figures 23A, 23B:
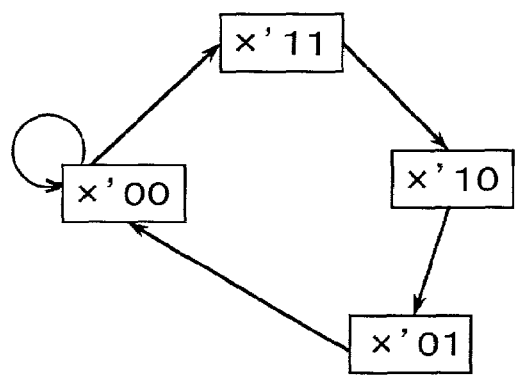
FIG. 23A shows the instruction overriding control process and FIG. 23B shows the conditional execution status transition chart for the seventh embodiment of the present invention.

It should be noted that in the foregoing explanations, the register R0 and the register R1 had the same values, so that the value of the zero flag became "1", but also if the register R0 and the register R1 do not have the same values and the value of the zero flag becomes "0", an instruction overriding control can be performed by letting the instruction overriding control circuit 708 control the instruction overriding signal 707 in accordance with FIG. 23A. In that case, the subsequent instructions 2 and 3 are both executed.

Moreover, in the example described above, the instruction 1 selects from the processor status words 712 the zero flag as the instruction overriding signal 707, but there is no limitation to this, and it is also possible to select other processor status words 712.

Eighth Embodiment

As the eighth embodiment, examples of a third and a fourth program conversion device of the present invention are explained. In the sixth embodiment, there was only one subsequent instruction, whereas in this eighth embodiment, the subsequent instructions are a subsequent instruction group including a plurality of instruction strings.

A program conversion device of the present invention is explained with reference to the FIGS. 20, 24, 26 and 27. Elements that already have been explained are denoted by like numerals, and their further explanation has been omitted.

The overall configuration of the data processing device of the eighth embodiment is shown in FIG. 20, and can be as in the sixth embodiment, so that further explanations have been omitted.

The following is an example of the operation of rewriting a program with the program conversion device of the eighth embodiment. In this example, the not-yet-rewritten assembly language program in FIG. 26 is rewritten into the machine language program in FIG. 24. The machine language program in FIG. 24 is the same as the program used in the seventh embodiment. The instructions in FIGS. 24 and 26, given in mnemonic notation, are as in the above-explained program, and only the operands (immediate values and registers) such as used for the ADD instruction or the MOV instruction are different, so that further explanations have been omitted.

Figure 27:
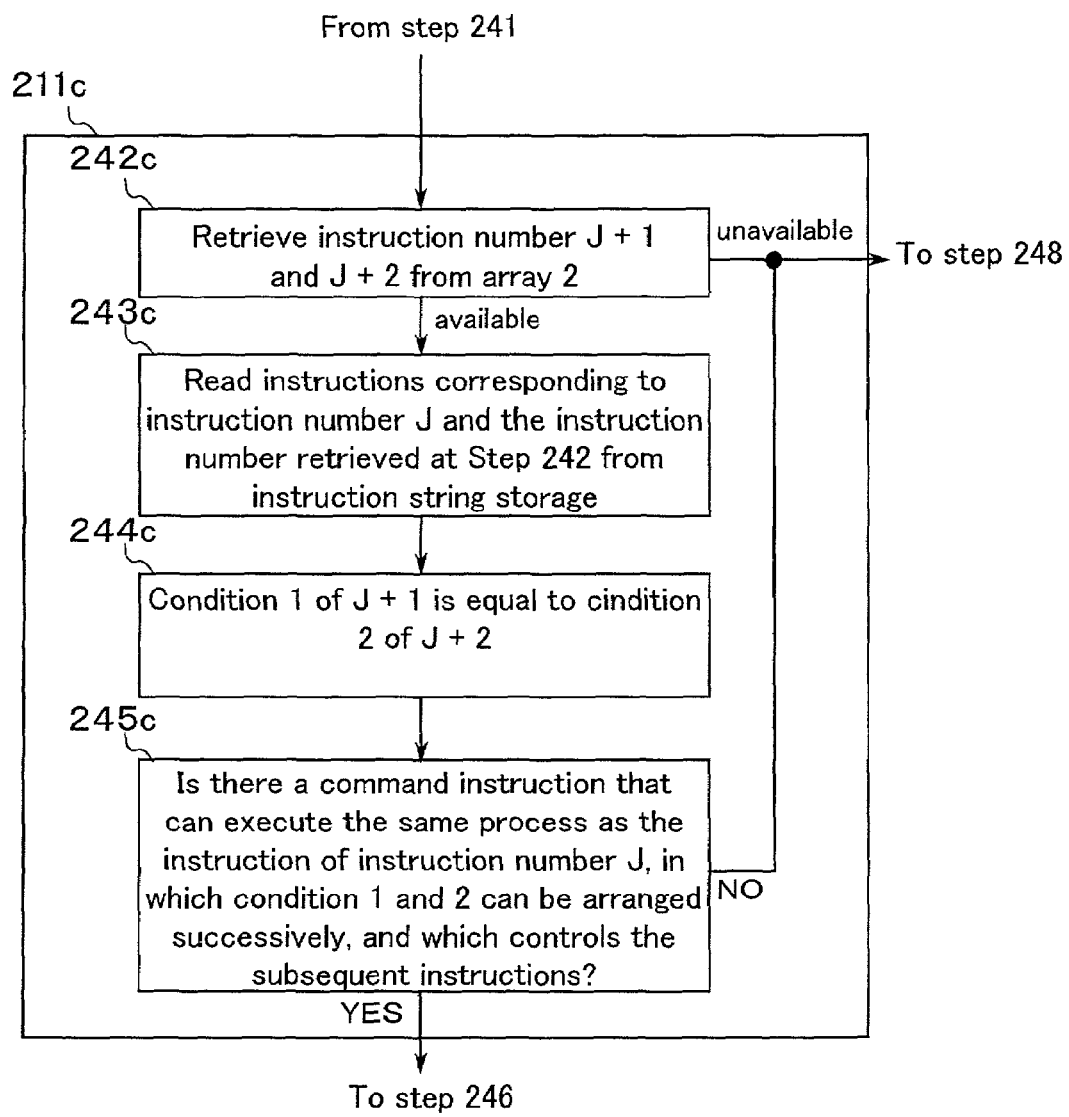
FIG. 27 is a flowchart showing the first half of the second process 207 performed by a program conversion device in accordance with the eighth embodiment of the present invention.

FIG. 27 is a flowchart showing the first half of the second process 207 performed by the program conversion device in accordance with the eighth embodiment. This second process 207 accomplishes an instruction rewriting portion for rewriting condition/decision instructions detected by the first process 206 into instruction strings of a computational instruction and a group of subsequent instructions that follow this computational instruction and are associated with this computational instruction. This second process 207 is realized by the first judgment portion 208, the instruction retrieval portion 210, and the instruction rewriting portion 205.

It should be noted that numeral 211c in FIG. 27 denotes a portion corresponding to numeral 211 in FIG. 10, whereas other elements are as in FIG. 10 and are therefore not explained any further.

In Step 242c, the first judgment portion 208 retrieves the instruction numbers J+1 and J+2 from the array 2. That is to say, Step 242c executes the first judgment portion, which judges, after the instruction detected by the second instruction detection portion, whether there is an instruction group detected by the second instruction detection portion.

Step 243c reads out and stores instructions corresponding to the instruction numbers (here, instructions A, B and C).

Step 244c judges whether the instruction B and the instruction C are the same condition 1.

Step 245c judges whether there is a command instruction that can execute the same process as instruction A, in which condition 1 can be arranged successively, and which controls the subsequent two instructions. That is to say, this Step 245c accomplishes the command instruction retrieval portion, which retrieves from the machine language instruction code a command instruction that indicates the same process execution as the instruction detected by the first instruction detection portion, and that indicates the execution condition for the subsequent conditional instruction group.

The following is a description of the processing of 211c in the eighth embodiment.

The following is an explanation of the operation by which the not-yet-rewritten assembly language program in FIG. 26 is rewritten into the machine language program in FIG. 24, in the order of the first process 206 and the second process 207. It should be noted that the instruction of the first line is denoted as instruction (1), the instruction of the second line is denoted as instruction (2) etc., that is, with the line number in parentheses.

First Process 206

The first process 206 is carried out similarly as in the second embodiment, and finally, 1 and 4 are stored in the array 1, whereas 2 and 3 are stored in the array 2. These numbers are later used by the second process 207.

Second Process 207

Step 240: The process begins from the element in the first line of the array 1.

Step 241: The 1, which is the instruction number of the first line, is read out from the array 1 and stored in the variable J.

Step 242c: The first judgment portion 208 retrieves the instruction numbers J+1 and J+2 from the array 2. Because now J=1 and because instruction (2) and instruction (3) exist, the procedure advances to Step 243c.

Step 243c: The instructions corresponding to variables J to J+2 are read from the instruction string storage, and stored as instruction A (SUB), instruction B (MOVIFNZF), and instruction C (MOVIFNZF) respectively.

Step 244c: It is judged whether the condition of the instruction B and the condition of the instruction C are the same. Here, they are the same, so that this condition is taken as the condition 1, and the procedure advances to the next step.

Step 245c: The instruction retrieval portion 210 judges whether there is a command instruction that can execute the same process as instruction A, in which the condition 1 can be arranged successively, and which controls the subsequent two instructions. Here, SUBIFNXZF is a candidate, so that the procedure advances to Step 246.

Step 246: The instruction rewriting portion 205 rewrites the instruction A into SUBIFNXZF. Furthermore, it rewrites the process corresponding to the instructions B and C with an instruction that is executed unconditionally. Then, the procedure advances to Step 247.

Step 247: The instruction rewriting portion 205 rewrites the instructions corresponding to the variables J to J+2 in the instruction string storage into the instruction A (SUBIFXZF), the instruction B (MOV), and the instruction C (MOV), respectively.

Step 248: It is judged whether all instruction numbers of the array 1 have been processed. There are still instruction numbers left, so that the procedure advances to Step 249.

Step 249: The pointer to the array 1 is increased incrementally by 1, so as to process the next instruction number in the array 1.

Step 241: The 4, which is the instruction number of the second line, is read out from the array 1 and stored in the variable J.

Step 242: The first instruction detection portion 202 retrieves the instruction number of the variables J+1 and J+2 from the array 2. Because now J=4, it is determined whether there are instructions (5) and (6) in the array 2. Here, there are no instructions (5) and (6), so that the procedure advances to Step 248.

Step 248: It is determined whether all instruction numbers of the array 1 have been processed. There are no more instruction numbers in the array 1, so that the procedure advances to Step 250.

Step 250: The second process 207 is terminated.

Thus, with this eighth embodiment, the instructions (1), (2) and (3) of FIG. 26 as stored in the instruction string storage 201, are rewritten into the instructions (1), (2) and (3) of FIG. 24.

Thus, the program conversion device 62 can rewrite instruction groups stored finally in the instruction string storage 201 into instruction strings including command instructions for which a condition for execution is indicated and instruction groups for which no condition for execution is indicated. In contrast to the conventional technology, this approach can process a great variety of unconditional instructions, without allotting new code, as instructions that are executed conditionally depending on the state of the processor.

It should be noted that although an assembly language program was input into the program conversion device of the eighth embodiment, it is also possible to devise the program conversion device such that a machine language program is input to generate a new machine language program.

Ninth Embodiment

The data processing device of the ninth embodiment of the present invention performs data processing by pipelining with at least the three stages of fetching, decoding and executing instructions, and includes an instruction pre-fetching portion for pre-fetching and storing instructions, an instruction decoding portion for decoding instructions, an instruction execution portion for executing instructions, and an instruction overriding control portion which skips the instructions that should be overridden with the instruction pre-fetching portion when instructions or instruction strings are overridden. In the first, third, fifth and seventh embodiment, a format was adopted in which the overridden instructions are not executed in the EX stage, whereas in the data processing device of the ninth embodiment, the overridden instructions are skipped by not reading them during the IF stage.

The following describes a data processing device in accordance with the ninth embodiment of the present invention with reference to the FIGS. 1, 2, 28, 29, 30 and 31. It should be noted that portions that are the same as in the first embodiment etc. are denoted by like numerals, and their further explanation has been omitted.

The overall configuration of the data processing device of the ninth embodiment can be as in FIG. 1, and the configuration of the processor can be as in FIG. 2. The configuration of the data processing device and the processor can be as described in the first embodiment, so that further explanations have been omitted.

Figure 28:
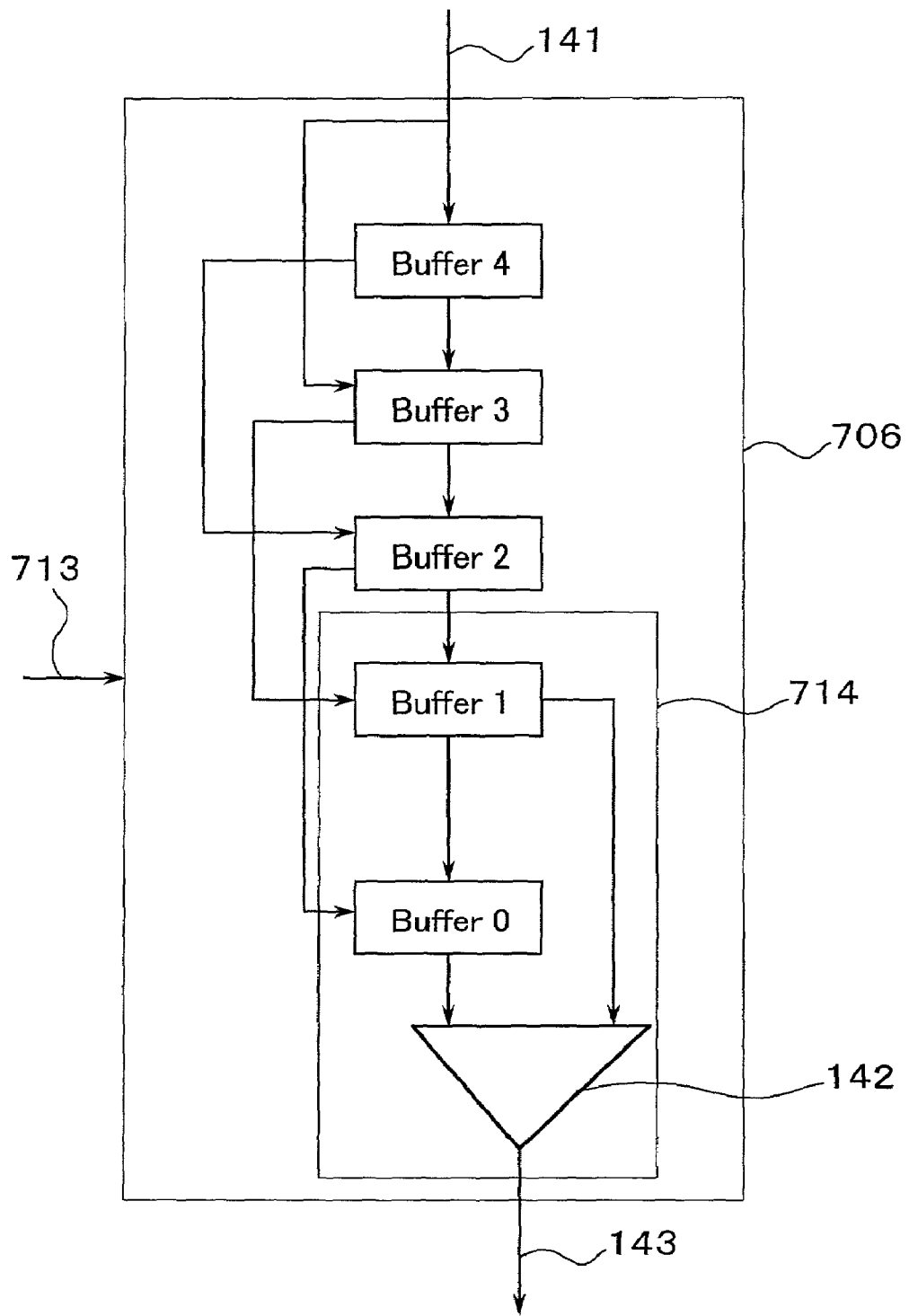
FIG. 28 shows an example of the configuration of the instruction fetch circuit 706 of the ninth embodiment of the present invention.

FIG. 28 shows an example of the configuration of the instruction fetch circuit 706. Numeral 141 denotes an instruction from the ROM 717. Numeral 142 denotes an instruction selector for selecting instructions stored in a buffer 0 and a buffer 1 in accordance with an instruction pre-fetch control signal 713. Numeral 143 is an instruction to be decoded. The instruction fetch circuit 706 in the ninth embodiment is made of a regular instruction queue, instructions 141 are fetched into the five buffers 0 to 4 for pre-fetching and storing instructions from the ROM 717, in accordance with the timing that controls the pipeline. The pre-fetch instructions are always stored starting with the buffer 0, which has the smallest number. When four instructions are stored, those instructions are stored in the buffers 0 to 3. When at the IF stage there is no necessary instruction in the decoder, the instruction fetch circuit 706 stops the processing of the other stages (DEC, EX stage) in order to fetch an instruction, and when the processing of other stages (DEC, EX stage) is extended (several stages are necessary), the instruction fetch circuit 706 pre-fetches instructions until the instruction queue is full. It should be noted that the instruction latch 714 of the first embodiment is made of the buffer 0, the buffer 1, and the instruction selector 142 in this embodiment.

The following is an explanation of a method for controlling the instruction fetch circuit 706 of this ninth embodiment, with reference to FIG. 29. The instruction queue can be operated in two different ways, which are selected by the instruction pre-fetch control signal 713.

Figure 29A:
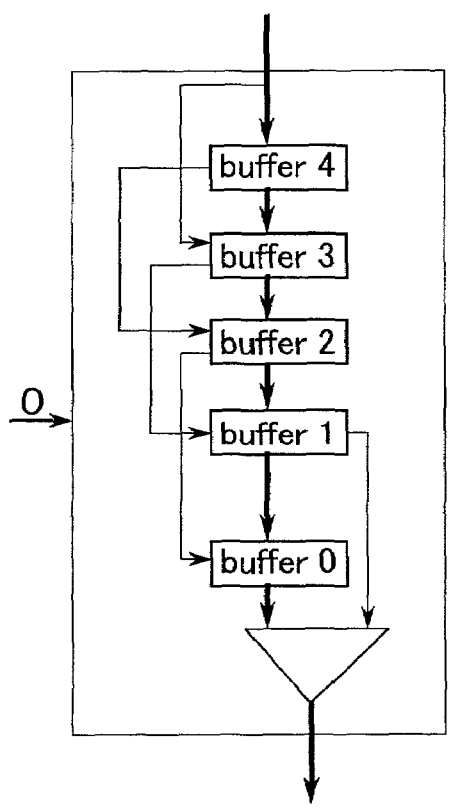
FIGS. 29A and 29B show examples of methods for controlling the instruction fetch circuit 706 of the ninth embodiment of the present invention.

The first way of reading is shown in FIG. 29A: An instruction is read from the ROM 717 into the buffer 4, the instruction stored in the buffer 4 is forwarded to the buffer 3, the instruction stored in the buffer 3 is forwarded to the buffer 2, the instruction stored in the buffer 2 is forwarded to the buffer 1, the instruction stored in the buffer 1 is forwarded to the buffer 0, and the instruction stored in the buffer 0 is forwarded to the decoder. Reading the instructions in this manner, the instructions are read in the order of their original sequence.

Figure 29B:
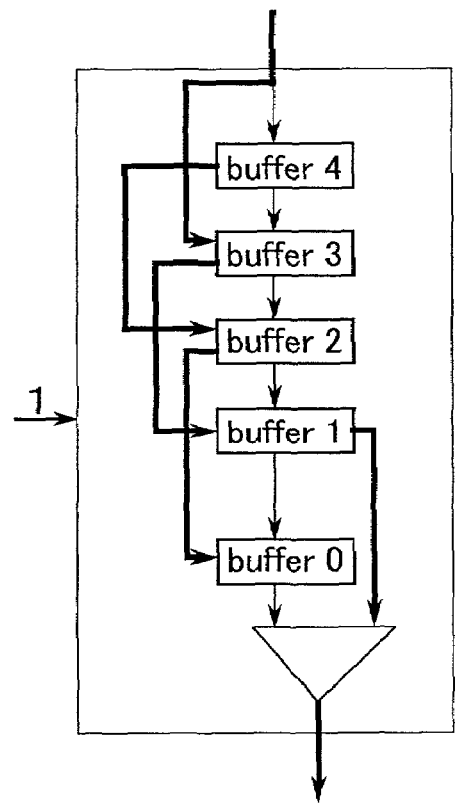
Figure 32:
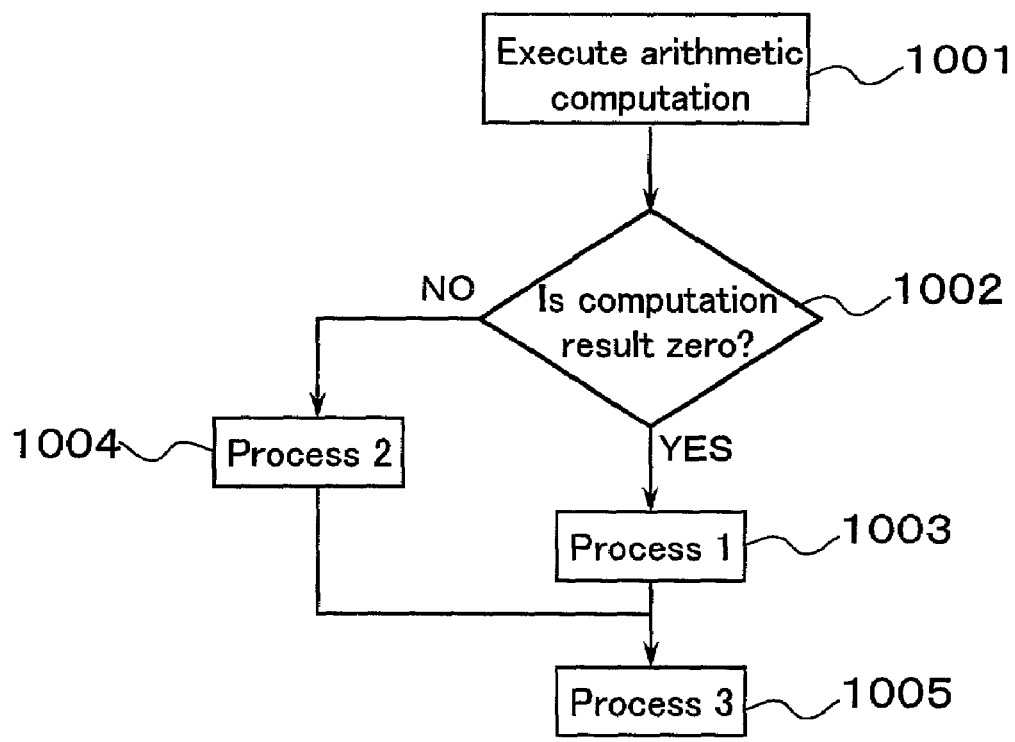
FIG. 32 is a flowchart showing a conventional branching process.
Figure 35:
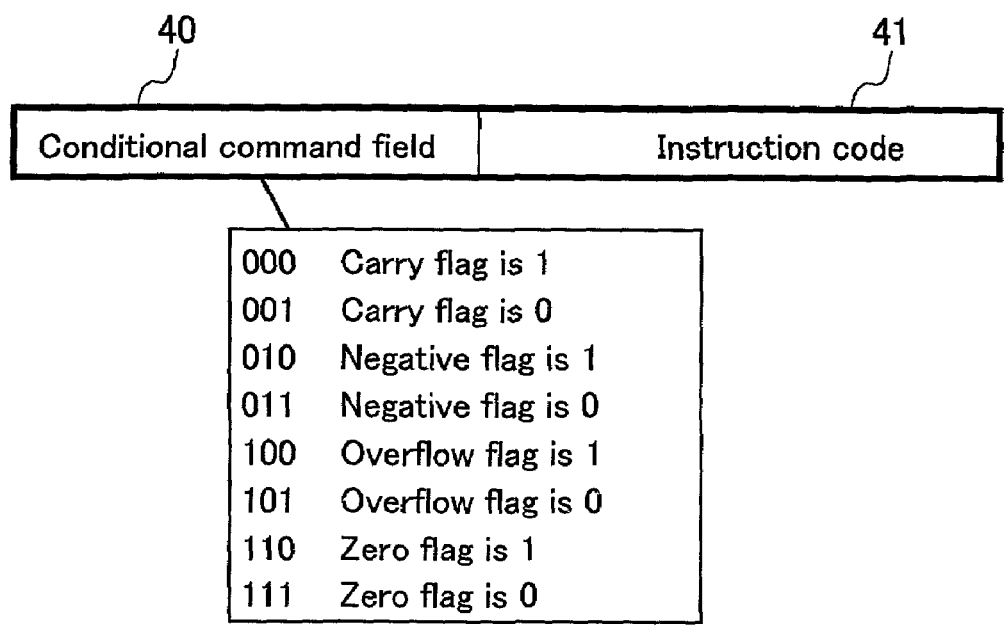
FIG. 35 shows a specific example of a conventional three bit condition specifying field.

The second way of reading is shown in FIG. 29B: An instruction is read from the ROM 717 into the buffer 3, the instruction stored in the buffer 4 is forwarded to the buffer 2, the instruction stored in the buffer 3 is forwarded to the buffer 1, the instruction stored in the buffer 2 is forwarded to the buffer 0, the instruction stored in the buffer 1 is forwarded to the decoder. Reading the instructions in this manner, the instructions are forwarded to buffers that are temporally one position more advanced than the buffers shown in FIG. 29A, and the instruction stored in the buffer 1 is forwarded to the decoder, which has the effect that one instruction is skipped.

That is to say, depending on the instruction pre-fetch control signal 713, either the buffer 0 or the buffer 1 can be selected and forwarded to the decoder as the instruction 143 to be decoded. This means, the instruction selector 142 selects FIG. 29A when the instruction pre-fetch control signal 713 is "0" and FIG. 29B when the instruction pre-fetch control signal 713 is "1".

FIG. 30 shows the instruction overriding control process and a transition chart of the conditional execution status 709 in accordance with the ninth embodiment. The exclusive condition 701 in FIG. 30 denotes the processor status selected by the command instruction of the present invention and takes on the binary value 0 or 1. The conditional execution status 709 in FIG. 30 similarly represents the state during the conditional execution of the subsequent instruction, with the command instruction of the present invention. FIG. 30A lists whether the instruction overriding control circuit 708 overrides or executes the processing of the EX stage. Here, in contrast to FIG. 3A, the case that the exclusive condition 701 is "1" and the conditional execution status 709 is "x'01" does not exist.

FIG. 30B is a transition chart of the conditional execution status 709, controlled by the sequencer 716. The conditional execution status 709 is set from "x'00" to "x'11" when a command instruction is decoded, and at the next DEC stage, the subsequent instruction is decoded, and the conditional execution status 709 is updated to "x'10". Then, if the exclusive condition 701 is "1", the sequencer 716 updates the conditional execution status 709 from "x'10" to "x'00", and if the exclusive condition 701 is "0", the sequencer 716 updates the conditional execution status 709 from "x'10" to "x'01". This means, only when the conditional execution status 709 is "x'10", the sequencer 716 updates to the next value in accordance with the exclusive condition 701.

FIG. 30C is a status table showing the states of the instruction pre-fetch control signal 713. In this ninth embodiment, the state of the instruction pre-fetch control signal 713 is determined by the exclusive condition and the state of the conditional execution status. Switching the instruction pre-fetch control signal 713 determines whether the reading is performed in accordance with FIG. 29A or FIG. 29B. As shown in FIG. 30C, only when the exclusive condition 701 is "1" and the conditional execution status 709 is "x'10", the instruction pre-fetch control signal 713 is "1".

The following is an explanation of the operation of a data processing device in accordance with the ninth embodiment with the above-described configuration. In the following explanations, the machine language program 1 of FIG. 5 is executed, which also was used in the first embodiment.

FIG. 31 shows an operation timing chart of the processor 64. FIG. 31 illustrates the operation when executing FIG. 5, illustrating the timing of the instructions processed at the IF stage, the DEC stage and the EX stage of the pipeline in so-called machine cycles. As shown in FIG. 31, the instruction overriding control circuit 708 is operated in accordance with the timing expressed by the first half (for example timing t11) and the second half (timing t12) of the stages. In particular in the DEC stage, the conditional execution status 709 and the instruction pre-fetch control signal 713 are updated by the instruction overriding control circuit 708 at the second half of the timing. At the first half of the timing in the EX stage, it is decided in accordance with the instruction overriding signal 707 whether an instruction at that stage is executed or overridden. Furthermore, at the IF stage and the DEC stage, instructions are read from the instruction fetch circuit 706 depending on the instruction pre-fetch control signal 713 at the first half of the timing. The following is an explanation of the operations at each timing, in their temporal order. Here, it is assumed that "x'0001" has been stored in both the registers R0 and R1, "x'0002" has been stored in R2, "x'0003" has been stored in R3, "x'0004" has been stored in R4, "x'0005" has been stored in R5.

Timing t1
 IF stage: instruction 1 [SUBIFEZF R0, R1]
 Timing t11: Because the instruction pre-fetch control signal 713 is "0", instruction 1 is forwarded from the buffer 1 to the buffer 0, and instruction 2 is forwarded from the buffer 2 to the buffer 1.

Timing t2
 DEC stage: instruction 1 [SUBIFEZF R0, R1]
 Timing t21: Because the instruction pre-fetch control signal 713 is "0", the instruction selector 142 forwards the instruction 1, which has been stored in the buffer 0 at the timing t1, into the instruction decoder 705, where it is decoded. Register R0 is read out and "x'0001" is stored in the D1 latch 710. Register R1 is read out and "x'0001" is stored in the D2 latch 711.
 Timing t22: The instruction overriding control circuit 708 sets the conditional execution status 709 to "x'11". The zero flag is selected by the selector 702 as the register expressing the exclusive condition 701.
 IF stage: instruction 2 [MOV R2, R4]
 Timing t21: Because the instruction pre-fetch control signal 713 is "0", instruction 2 is forwarded from the buffer 1 to the buffer 0, and instruction 3 is forwarded from the buffer 2 to the buffer 1.

Timing t3
 EX stage: instruction 1 [SUBIFEZF R0, R1]
 Timing t31: The instruction overriding signal 707 stays in its initial state "0", so that the execution of instruction 1 begins. The values stored in the D1 latch 710 and the D2 latch 711 are subtracted by the arithmetic and logic unit 703. Here, the same value "x'0001" is stored both in the D1 latch 710 and the D2 latch 711, so that "x'0000" is stored as the result of the subtraction in the register R1. As a result, "1" is stored in zero flag.
 DEC stage: instruction 2 [MOV R2, R4]
 Timing t31: Because the instruction pre-fetch control signal 713 is "0", the instruction selector 142 forwards the instruction 2, which has been stored in the buffer 0 at the timing t2, into the instruction decoder 705, where it is decoded. The register R2 is read out, and the value "x'0002" is stored in the D1 latch 710.
 Timing t32: The instruction overriding control circuit 708 updates the conditional execution status 709 from "x'11" to "x'10". Here, the conditional execution status 709 is "x'10" and the exclusive condition is "1", so that the instruction pre-fetch control signal 713 is updated from "0" to "1".
 IF stage: instruction 3 [MOV R3, R4]
 Timing t31: Because the instruction pre-fetch control signal 713 is "0", instruction 3 is forwarded from the buffer 1 to the buffer 0, and instruction 4 is forwarded from the buffer 2 to the buffer 1, in accordance with the reading method in FIG. 29A.

Timing t4

EX stage: instruction 2 [MOV R2, R4]

Timing t41: Because the instruction overriding signal 707 is "0", the execution of instruction 2 begins. The value stored in the D1 latch 710 is passed through the arithmetic and logic unit 703, and stored in the register R4.

DEC stage: instruction 4 [ADD R5, R6]

Timing t41: Because the instruction pre-fetch control signal 713 is "1", the instruction selector 142 forwards the instruction 4, which has been stored in the buffer 1 at the timing t3, into the instruction decoder 705, where it is decoded, in accordance with the reading method of FIG. 29B. The register R5 is read out and stored in the D1 latch 710, and the register R6 is read out and stored in the D2 latch 711.

Timing t42: The instruction overriding control circuit 708 updates the conditional execution status 709 from "x'10" to "x'00". In accordance with FIG. 30A, no instruction overriding signal 707 is generated, so that the instruction overriding signal 707 is "0". Here, the conditional execution status 709 is "x'00" and the exclusive condition 701 is "1", so that the instruction pre-fetch control signal 713 is updated from "1" to "0".

IF stage: instruction 5 [NOP]

Timing t41: Because the instruction pre-fetch control signal 713 is "1", instruction 5 is forwarded from the buffer 2 to the buffer 0, and instruction 6 is forwarded from the buffer 3 to the buffer 1, in accordance with the reading method in FIG. 29B.

Timing t5

EX stage: instruction 4 [ADD R5, R6]

Timing t51: Because the instruction overriding signal 707 is "0", execution of instruction 4 begins. The values stored in the D1 latch 710 and the D2 latch 711 are added by the arithmetic and logic unit 703, and then the sum is stored in the register R6.

DEC stage: instruction 5 [NOP]

Timing t51: Because the instruction pre-fetch control signal 713 is "0", the instruction selector 142 forwards the instruction 5, which has been stored in the buffer 0 at the timing t4, into the instruction decoder 705, where it is decoded. Here, it is a NOP instruction, so that nothing happens.

Timing t52: The instruction overriding control circuit 708 holds the conditional execution status 709 at "x'00", and holds the instruction pre-fetch control signal 713 at "0".

IF stage: instruction 6 [NOP]

Timing t51: Because the instruction pre-fetch control signal 713 is "0", instruction 6 is forwarded from the buffer 1 to the buffer 0, and instruction 7 is forwarded from the buffer 2 to the buffer 1, in accordance with the reading method in FIG. 29A.

Thus, whereas in the previously explained first embodiment, the instruction 3 was overridden at the timing t5 and the instruction 4 was executed at the timing t6, in this ninth embodiment, the instruction 4 can be executed at the timing t5. This is, because the instruction overriding control circuit 708 is configured such that at the timing t32, an instruction pre-fetch control signal 713 is generated, and at the timing t42, no instruction overriding signal 707 is generated.

That is to say, with this ninth embodiment, the conditional execution status 709 that has been set by the command instruction of the present invention is updated at the DEC stage, and the instruction pre-fetching control signal 713 and the instruction overriding signal 707 are controlled so as to skip reliably the instructions that should be overridden in accordance with the conditional execution status 709 and the exclusive condition 701, so that when the command instruction is decoded and an instruction or an instruction string arranged behind it is overridden in accordance with the exclusive condition 701, the instruction to be overridden is skipped with the instruction pre-reading portion and the next instruction is forwarded to the instruction decoding portion, thus decreasing pipeline hazards.

Thus, in data processing devices with conditionally executed instructions in which branching instructions are reduced and pipeline stalls are diminished, as well as in case-handling programs in which one of two programs is executed depending on a condition, pipeline stalls used to be caused invariably by the overridden instructions, but with a data processing device of the present invention, data processing is possible without causing pipeline stalls when an instruction or an instruction string arranged behind it is overridden.

In the ninth embodiment, a single instruction as shown in the first embodiment is executed as an exclusively conditionally executed instruction but this embodiment also can be applied to the case shown in the third embodiment, in which two instruction strings for which no condition is indicated are executed as exclusively conditionally executed instructions. In this case, if an instruction string arranged behind the command instruction is overridden, a plurality of instructions (for example two in the third embodiment) will be overridden, so that a pipeline flush is avoided at several stages, which is even more effective. In this case, a structure should be provided, by which the instruction queue skips a plurality of instructions, and not only one instruction as in this embodiment. Also in the case of the seventh embodiment, in which one instruction group for which no condition was given is indicated as a conditionally executed instruction, it is also possible to adopt a configuration, which skips the instructions except for the one instruction arranged directly behind the command instruction, when an instruction string is overridden.

Also, the number of pipeline stages in the ninth embodiment is three, but the present invention also can be applied to pipelines of five stages including a MEM stage (memory access) and a WB stage (register rewrite).

With the data processing device and the program conversion device of the present invention, unconditional execution commands can be executed conditionally by command instructions that indicate the subsequent instruction strings in advance as conditionally executed instructions, so that types of instructions of the data processing device and the freedom of allocation are increased, contributing to a lowering of the program memory capacity.

Moreover, for data processing with conditional execution, in which one of two processes is executed in accordance with a condition, or a process is executed that is only decided when a certain condition is fulfilled, the data processing efficiency can be increased by suppressing pipeline hazards that used to be caused by processes that are overridden, so that the present invention is advantageous for many practical applications.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description.

All changes that come within the meaning and range of equivalency of the claims are intended to be embraced therein.

What is claimed is:

1. A data processing device programmed for reading in and executing instructions in a certain sequence, the data processing device comprising:
 a fetch portion for reading in a computational instruction;
 a decoding portion for decoding the computational instruction that has been read in;
 an execution portion for executing the computational instruction in accordance with a decoding of the computational instruction;
 a sequencer for updating an output to one of at least three different states as a conditional execution status in response to each instruction decoding operation among the computational instruction and subsequent instructions including a plurality of instructions that are sequentially arranged as an instruction sequence after the computational instruction; and
 an instruction overriding control circuit for controlling an overriding of any instruction of the subsequent instructions, the overriding of any instruction designated in response to a value of a status flag determined by execution of the computational instruction and the conditional execution status updated by the sequencer.

2. The data processing device according to claim 1, wherein the instruction overriding control circuit overrides none of the subsequent instructions in response to a value of the status flag determined by execution of the computational instruction regardless of the conditional execution status updated by the sequencer.

3. A data processing device programmed for reading in and executing instructions in a certain sequence, the data processing device comprising:
 a fetch portion for reading in a computational instruction;
 a decoding portion for decoding the computational instruction that has been read in;
 an execution portion for executing the computational instruction in accordance with a decoding of the computational instruction;
 a sequencer for updating an output to one of at least three different states as a conditional execution status in response to each instruction decoding operation among the computational instruction and subsequent instructions including a plurality of instructions that are sequentially arranged as an instruction sequence after the computational instruction; and
 an instruction overriding control circuit for overriding at least one instruction of the subsequent instructions, the at least one instruction designated in response to a value of a status flag determined by execution of the computational instruction and the conditional execution status updated by the sequencer.

4. The data processing device according to claim 3, wherein the instruction overriding control circuit overrides the at least one instruction by overriding an execution of the at least one instruction in the execution portion.

5. The data processing device according to claim 3, wherein the subsequent instructions include a first instruction and a second instruction, and the computational instruction, the first instruction, and the second instruction are sequentially arranged as an instruction sequence,
 wherein the overriding control circuit overrides one of the first instruction and the second instruction when the status flag takes a given value.

6. The data processing device according to claim 5, wherein the instruction overriding control circuit overrides another one of the first instruction and the second instruction when the status flag takes a different value from the given value.

7. The data processing device according to claim 5, wherein each of the first instruction and the second instruction does not have any condition for indicating an overriding of any instruction arranged after the computational instruction,
 wherein the subsequent instructions are not any branch instructions.

8. The data processing device according to claim 3, wherein the subsequent instructions include a first instruction group including a plurality of instructions and a second instruction group including a plurality of instructions, and the computational instruction, the first instruction group, and the second instructional group are sequentially arranged as an instruction sequence,
 wherein the overriding control circuit overrides one of the first instruction group and the second instruction group when the status flag takes a given value.

9. The data processing device according to claim 8, wherein the instruction overriding control circuit overrides another one of the first instruction group and the second instruction group when the status flag takes a different value from the given value.

10. The data processing device according to claim 8, wherein any instruction included in both the first instruction group and the second instruction group does not have any condition for indicating an overriding of any instruction arranged after the computational instruction,
 wherein the subsequent instructions are not any branch instructions.

11. The data processing device according to claim 3, wherein the subsequent instructions include a first instruction and a second instruction, and the computational instruction, the first instruction, and the second instruction are sequentially arranged as an instruction sequence,
 wherein the overriding control circuit overrides only the first instruction only when the status flag takes a given value.

12. The data processing device according to claim 11, wherein the first instruction does not have any condition for indicating an overriding of any instruction arranged after the computational instruction,
 wherein the subsequent instructions are not any branch instructions.

13. The data processing device according to claim 3, wherein the subsequent instructions include a first instruction group including a plurality of instructions and a second instruction group including a plurality of instructions, and the computational instruction, the first instruction group, and the second instruction group are sequentially arranged as an instruction sequence,
 wherein the overriding control circuit overrides only the first instruction group only when the status flag takes a given value.

14. The data processing device according to claim 13, wherein any instruction in the first instruction group does not have any condition for indicating an overriding of any instruction arranged after the computational instruction,
 wherein the subsequent instructions are not any branch instructions.

15. A data processing device programmed for reading in and executing instructions in a certain sequence, the data processing device comprising:

a fetch portion for reading in a computational instruction;

a decoding portion for decoding the computational instruction that has been read in;

an execution portion for executing the computational instruction in accordance with a decoding of the computational instruction;

a sequencer for updating an output to one of at least three different states as a conditional execution status in response to each instruction decoding operation among the computational instruction and subsequent instructions including a plurality of instructions that are sequentially arranged as an instruction sequence after the computational instruction; and an instruction overriding control circuit for overriding at least one instruction of the subsequent instructions, the at least one instruction designated in response to a value of a status flag determined by execution of the computational instruction and the conditional execution status updated by the sequencer by allowing the fetch portion to skip reading in the at least one instruction.

16. The data processing device according to claim 15, wherein the fetch portion includes a plurality of buffers to override the at least one instruction.

17. The data processing device according to claim 15, wherein the subsequent instructions include a first instruction and a second instruction, and the computational instruction, the first instruction, and the second instruction are sequentially arranged as an instruction sequence, wherein the overriding control circuit overrides one of the first instruction and the second instruction by allowing the fetch portion to skip reading in the one of the first instruction and the second instruction when the status flag takes a given value.

18. The data processing device according to claim 17, wherein the instruction overriding control circuit overrides another one of the first instruction and the second instruction by overriding an execution of the another one of the first instruction and the second instruction in the execution portion when the status flag takes a different value from the given value.

* * * * *